(12) United States Patent
Newman

(10) Patent No.: US 10,840,615 B2
(45) Date of Patent: Nov. 17, 2020

(54) CONNECTION ENCLOSURE ASSEMBLIES, CONNECTOR SYSTEMS AND METHODS FOR FORMING AN ENCLOSED CONNECTION BETWEEN CONDUCTORS

(71) Applicant: TE CONNECTIVITY CORPORATION, Berwyn, PA (US)

(72) Inventor: John Anthony Newman, Garner, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 16/453,513

(22) Filed: Jun. 26, 2019

(65) Prior Publication Data

US 2020/0006869 A1 Jan. 2, 2020

Related U.S. Application Data

(60) Provisional application No. 62/691,419, filed on Jun. 28, 2018.

(51) Int. Cl.
| | | |
|---|---|---|
| *H01R 4/2445* | (2018.01) | |
| *H01R 4/70* | (2006.01) | |
| *H01R 13/58* | (2006.01) | |

(52) U.S. Cl.
CPC .............. *H01R 4/2445* (2013.01); *H01R 4/70* (2013.01); *H01R 13/582* (2013.01)

(58) Field of Classification Search
CPC .............. H01R 13/5215; H01R 13/521; H01R 13/582; H01R 4/2445; H01R 4/70
(Continued)

(56) References Cited

U.S. PATENT DOCUMENTS

| | | |
|---|---|---|
| 2,164,381 A | 7/1939 | Bradley |
| 2,219,846 A | 10/1940 | Meyer |
| (Continued) | | |

FOREIGN PATENT DOCUMENTS

| | | |
|---|---|---|
| CN | 1298565 | 2/2007 |
| CN | 1933267 | 3/2007 |
| (Continued) | | |

OTHER PUBLICATIONS

"4 POS Block Ass'y" Tyco Electronics Brasil LTDA (1 page) (Apr. 28, 2009).

(Continued)

*Primary Examiner* — Gary F Paumen

(57) ABSTRACT

An enclosed connection system for mechanically and electrically connecting first and second cables, the cables each including an elongate electrical conductor covered by an insulation layer, includes an insulation piercing connector and an enclosure. The insulation piercing connector includes at least one electrically conductive piercing member and a clamping mechanism. The clamping mechanism is configured and operable to force the at least one piercing member through the insulation layers of the first and second cables and into electrical engagement with the conductors of the first and second cables such that the conductors of the first and second cables are electrically connected to one another through the at least one piercing member. The enclosure is configured to receive and cover the connection and to protect the insulation piercing connector.

18 Claims, 27 Drawing Sheets

(58) Field of Classification Search
USPC .......................................... 439/413, 521, 936
See application file for complete search history.

(56) References Cited

U.S. PATENT DOCUMENTS

| | | | |
|---|---|---|---|
| 2,858,522 A | 10/1958 | Wengen et al. | |
| 2,953,771 A | 9/1960 | Kussy | |
| 3,020,260 A | 2/1962 | Nelson | |
| 3,094,366 A | 6/1963 | Harmon, Jr. | |
| 3,112,148 A | 11/1963 | Wochner | |
| 3,147,338 A | 9/1964 | Ekvall et al. | |
| 3,223,776 A | 12/1965 | Piasecki | |
| 3,325,591 A | 6/1967 | William | |
| 3,325,776 A | 6/1967 | Eppler | |
| 3,372,361 A | 3/1968 | Wengen | |
| 3,425,028 A | 1/1969 | Neaderland | |
| 3,484,541 A | 12/1969 | Campbell | |
| 3,688,247 A | 8/1972 | Prodel | |
| 3,715,459 A | 2/1973 | Hoffman | |
| 3,848,956 A | 11/1974 | Kraft | |
| 3,876,279 A | 4/1975 | Underwood | |
| 3,879,575 A | 4/1975 | Dobbin et al. | |
| 4,070,082 A | 1/1978 | Werner | |
| 4,247,159 A | 1/1981 | Fruchard | |
| 4,369,284 A | 1/1983 | Chen | |
| 4,399,592 A | 8/1983 | Chopp, Jr. et al. | |
| 4,427,253 A | 1/1984 | Smith et al. | |
| 4,451,696 A | 5/1984 | Beinhaur | |
| 4,550,965 A | 11/1985 | Izraeli | |
| 4,600,261 A | 7/1986 | Debbaut | |
| 4,610,738 A * | 9/1986 | Jervis .................. | G02B 6/4447 156/48 |
| 4,634,207 A | 1/1987 | Debbaut | |
| 4,680,233 A | 7/1987 | Camin et al. | |
| 4,716,183 A | 12/1987 | Gamarra et al. | |
| 4,777,063 A | 10/1988 | Dubrow et al. | |
| 4,849,580 A | 7/1989 | Reuter | |
| 4,852,646 A | 8/1989 | Dittmer et al. | |
| 4,859,809 A | 8/1989 | Jervis | |
| 4,880,676 A | 11/1989 | Puigcerver et al. | |
| 4,909,756 A | 3/1990 | Jervis | |
| 4,942,270 A | 7/1990 | Gamarra | |
| 5,015,198 A | 5/1991 | Delin | |
| 5,079,300 A | 1/1992 | Dubrow et al. | |
| 5,099,088 A | 3/1992 | Usami et al. | |
| 5,129,839 A | 7/1992 | Vanskiver | |
| 5,140,746 A | 8/1992 | Debbaut | |
| 5,174,782 A | 12/1992 | Bogiel et al. | |
| 5,177,143 A | 1/1993 | Chang et al. | |
| 5,347,084 A | 9/1994 | Roney et al. | |
| 5,357,057 A | 10/1994 | Debbaut | |
| 5,397,859 A | 3/1995 | Robertson et al. | |
| 5,429,530 A | 7/1995 | Zander et al. | |
| 5,498,172 A | 3/1996 | Noda | |
| 5,525,073 A * | 6/1996 | Sampson ............. | H02G 15/113 439/521 |
| 5,561,269 A | 10/1996 | Robertson et al. | |
| 5,569,882 A | 10/1996 | Yokoyama et al. | |
| 5,594,210 A | 1/1997 | Yabe | |
| 5,722,850 A | 3/1998 | White | |
| 5,763,835 A | 6/1998 | Huynh-Ba et al. | |
| 5,828,005 A | 10/1998 | Huynh-Ba et al. | |
| 5,842,893 A | 12/1998 | De Keyser | |
| 5,911,604 A | 6/1999 | Chadbourne | |
| 5,916,001 A | 6/1999 | Chadbourne | |
| 5,944,564 A | 8/1999 | Chadbourne et al. | |
| 5,944,565 A | 8/1999 | Chadbourne et al. | |
| 6,045,414 A | 4/2000 | Defrance | |
| 6,099,344 A | 8/2000 | Chadbourne | |
| 6,106,323 A | 8/2000 | Elisei et al. | |
| 6,120,334 A | 9/2000 | Timsit et al. | |
| 6,135,804 A | 10/2000 | Lux | |
| 6,152,786 A | 11/2000 | Perrin et al. | |
| 6,169,250 B1 | 1/2001 | Bolcato | |
| 6,246,003 B1 | 6/2001 | Ferris et al. | |
| 6,265,665 B1 * | 7/2001 | Zahnen ................. | H01R 4/70 174/70 A |
| 6,309,261 B1 | 10/2001 | Chadbourne | |
| 6,322,402 B1 | 11/2001 | Chadbourne et al. | |
| 6,333,463 B1 | 12/2001 | Bukovnik et al. | |
| 6,517,391 B1 | 2/2003 | Chadbourne | |
| 6,648,671 B2 | 11/2003 | Suzuki et al. | |
| 6,668,427 B2 | 12/2003 | Bulanda et al. | |
| 6,692,292 B2 | 2/2004 | Huiskamp et al. | |
| 6,780,044 B1 | 8/2004 | Sawyer et al. | |
| 7,044,761 B2 | 5/2006 | Sokol et al. | |
| 7,104,832 B2 | 9/2006 | Campbell et al. | |
| 7,138,580 B2 | 11/2006 | Boutin | |
| 7,182,653 B1 | 2/2007 | Hoxha | |
| 7,309,263 B2 | 12/2007 | Copper et al. | |
| 7,341,479 B2 | 3/2008 | Boutin | |
| 7,417,190 B2 | 8/2008 | Pini | |
| 7,431,611 B2 * | 10/2008 | King, Jr. ................ | H02G 3/32 439/369 |
| 7,432,445 B2 | 10/2008 | Bird et al. | |
| 7,550,672 B2 | 6/2009 | Chadbourne et al. | |
| 7,686,661 B2 * | 3/2010 | Shrum ................. | H01R 4/5091 174/66 |
| 7,695,306 B2 | 4/2010 | Chiba | |
| 7,845,990 B2 * | 12/2010 | Shrum ............... | H01R 13/5216 174/66 |
| 7,950,956 B2 | 5/2011 | Hiner et al. | |
| 7,993,169 B1 | 8/2011 | Hoxha | |
| 8,016,622 B2 | 9/2011 | Battle | |
| 8,063,306 B2 | 11/2011 | Zhong et al. | |
| 8,227,696 B2 | 7/2012 | Pullium, III et al. | |
| 8,444,431 B1 | 5/2013 | La Salvia | |
| 8,748,741 B2 | 6/2014 | O'Sullivan et al. | |
| 9,059,579 B2 | 6/2015 | Pullium, III et al. | |
| 9,287,673 B2 | 3/2016 | Galla et al. | |
| 2007/0270046 A1 | 11/2007 | Copper et al. | |
| 2008/0050987 A1 | 2/2008 | Copper et al. | |
| 2008/0236863 A1 | 10/2008 | Hiner et al. | |
| 2008/0254664 A1 | 10/2008 | Hiner et al. | |
| 2010/0122829 A1 | 5/2010 | Pullium, III et al. | |
| 2013/0130538 A1 | 5/2013 | La Salvia | |

FOREIGN PATENT DOCUMENTS

| | | |
|---|---|---|
| CN | 101170247 | 4/2008 |
| CN | 201111309 | 9/2008 |
| CN | 101308959 | 11/2008 |
| CN | 203707359 U | 7/2014 |
| EP | 0409444 | 1/1991 |
| EP | 1139496 | 10/2001 |
| EP | 1760856 | 3/2007 |
| EP | 1885025 | 2/2008 |
| EP | 2360790 | 8/2011 |
| EP | 2808966 A1 | 12/2014 |
| FR | 2414800 | 8/1979 |
| FR | 2901415 | 11/2007 |
| GB | 1260902 | 1/1972 |
| GB | 2024538 | 6/1980 |
| GB | 2358293 | 7/2001 |
| JP | H0718357 | 3/1995 |
| JP | 2002056922 A | 2/2002 |
| JP | 2009148010 | 7/2009 |
| WO | 96/23007 | 8/1996 |
| WO | 97/05671 | 2/1997 |
| WO | 00/067354 | 11/2000 |
| WO | 2015/082674 | 6/2015 |

OTHER PUBLICATIONS

"6 POS Block Ass'y" Tyco Electronics Brasil LTDA (1 page) (May 5, 2009).

"8 POS Block Ass'y" Tyco Electronics Brasil LTDA (1 page) (May 11, 2009).

"CDP Conector Derivacao Perfurante Insulated Piercing Connector" Intelli-Industria de Terminals Eletricos Ltda (2 pages) (2010).

"Conector Perfurante NFC 33 020" Incesa (2 pages) (Date unknown but admitted prior art).

(56) References Cited

OTHER PUBLICATIONS

"DCNL—Insulated Piercing Connectors" Cavanna Group (2 pages) (Date unknown but admitted prior art).

"Electric Cable Fittings, Insulation Piercing Connector (IPC Connector)" Zhejiang Tianhong Electric Power Fitting Co. Ltd., Retrieved from URL: http://www.powerfittings.com/1-1-insulation-piercing.html (1 page) (Retrieved on Nov. 21, 2011).

"Gel H-Frame Closure—1000V (GHFC)" TE Connectivity Corporation (2 pages) (Oct. 2014).

"Grounding Connector, for All Electrical Grounding" Sicame Group (4 pages) (Date unknown but admitted prior art).

"Ilsco Insulation Piercing Connectors" Munro Electrical Supplies, Retrieved from URL: http://www.munroelectric.com/catalog/ilsco/insulation_html (1 page) (Retrieved on Nov. 21, 2011).

"Insulation piercing connector for customer service information" Tyco Electronics Simel S.A.S.—Energy Division (2 pages) (Mar. 2002).

"Insulation Piercing Connectors for insulated overhead lines" Tyco Electronics Simel S.A.S. (2 pages) (Mar. 2003).

"Insulation piercing connector for main to main connection" Tyco Electronics Simel S.A.S.—Energy Division (2 pages) (Mar. 2002).

"Insulation Piercing Connectors for street lighting applications" Tyco Electronics Simel S.A.S.—Energy Division (1 page) (Jul. 26, 2004).

"Insulation Piercing Connectors-IPC" Galvin Industries, Inc., Retrieved from URL: http://www.galvanelectrical.com/catalog/insulationPiercingConnectors.asp (1 page) (Retrieved on Nov. 21, 2011).

"Introducing LV Smart Ring Connector SRC4-70/150-10/10/70" Tyco Electronics Simel S.A. (2 pages) (Sep. 2012).

"IPC Insulated Piercing Connector" Yueqing Zhicheng Electrical Equipment Co., Ltd., Retrieved from URL: http://ceexinyu.en.made-in-china.com/product/YMjnZCQvfLVh/China-IPC-Insulated-Piercing-Connector.html (1 page) (Retrieved on Nov. 21, 2011).

"IPC-Insulation Piercing Connectors for Aerial Bundle Cable" EC21 Global B2B Marketplace, Retrieved from URL: http://www.ec21.com/product-details/IPC-Insulation-Piercing-Connectors-for-4875553.html (3 pages) (Retrieved on Nov. 21, 2011).

"IPC with 4 POS Block" Tyco Electronics Brasil LTDA (1 page) (Apr. 29, 2009).

"IPC with 6 POS Block" Tyco Electronics Brasil LTDA (1 page) (May 7, 2009).

"IPC with 8 POS Block" Tyco Electronics Brasil LTDA (1 page) (May 7, 2009).

"KZ y JZ Conectores Perforantes de Aislamiento IPC" Tyco Electronics Brasil S.A. (2 pages) (Date unknown but admitted prior art).

"Low Voltage Insulated Overhead Lines (LV ABC)" Tyco Electronics Simel S.A. Energy Division (12 pages) (Date unknown but admitted prior art).

"Materiels de Raccordement et d'isolation our rèseaux" Tyco Electronics, Edition Jul. 2004 (3 pages) (Nov. 2007).

"New Improved Product MSC Series Multiple Service Conductor" Sicame Australia Ply Ltd. 15(6) (3 pages) (Sep. 5, 2008).

"Service Insulation Piercing Connectors for Insulated Overhead Lines: P2X95 Mk2" Tyco Electronics SIMEL S.A.S. (1 page) (Apr. 20, 2014).

"Stainless Steel Ball Lock Ties" Raychem RPG (2 pages) (Oct. 22, 2013).

"TE Connectivity Product Kz EP" TE Connectivity (1 page) (Oct. 21, 2014).

"TE Connectivity Product LV Smart Ring Connector" TE Connectivity (1 page) (Oct. 21, 2014).

International Search Report and the Written Opinion of the International Searching Authority, or the Declaration, in corresponding PCT Application No. PCT/US2019/039517 (dated Oct. 9, 2019).

* cited by examiner

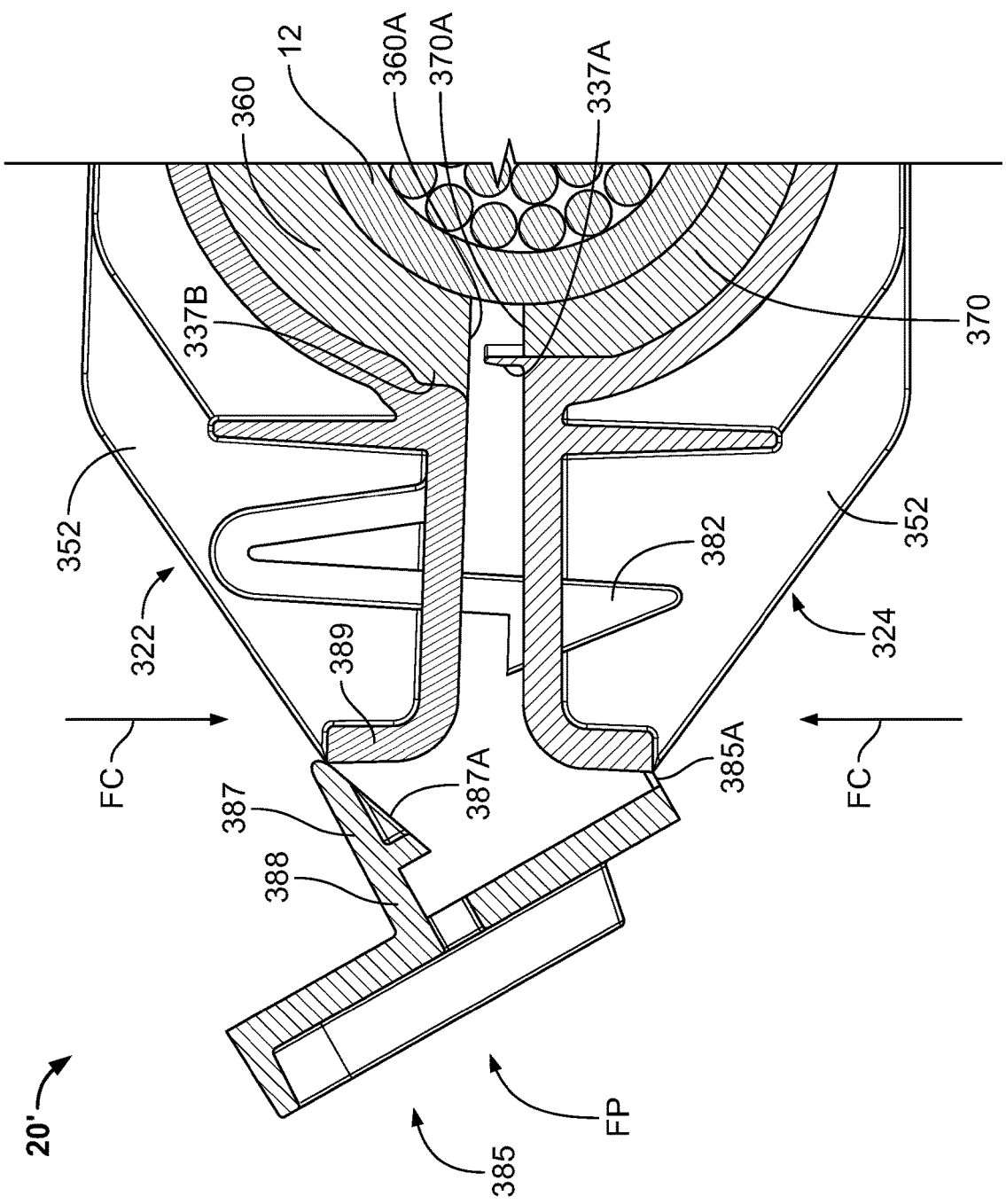

US 10,840,615 B2

CONNECTION ENCLOSURE ASSEMBLIES, CONNECTOR SYSTEMS AND METHODS FOR FORMING AN ENCLOSED CONNECTION BETWEEN CONDUCTORS

RELATED APPLICATION(S)

The present application claims the benefit of and priority from U.S. Provisional Patent Application No. 62/691,419, filed Jun. 28, 2018, the disclosure of which is incorporated herein by reference in its entirety.

FIELD OF THE INVENTION

The present invention relates to connectors and methods for forming connections and, more particularly, to connection enclosures and methods for connecting elongate electrical conductors.

BACKGROUND OF THE INVENTION

Electrical conductors often must be terminated or joined in various environments, such as underground or overhead. Such conductors may be, for example, high voltage electrical distribution or transmission lines. In order to form such connections, a connector may be employed. For example, in electrical power systems, it is occasionally necessary to tap into an electrical power line. One known system for tapping into an electrical power line is to use a tap connector for electrically connecting a main line electrical cable to an end of a tap line electrical conductor.

Insulation piercing (IP) connectors are commonly used to form mechanical and electrical connections between insulated cables. Typically, an IP connector includes metal piercing blades with sets of teeth on either end thereof. The piercing blades are mounted in housing members (e.g., along with environmental sealing components). The housing members are clamped about the insulated main and tap cables so that one set of teeth of a piercing blade engages the main cable and the other set of teeth of the piercing blade engages the tap cable. The teeth penetrate the insulation layers of the cables and make contact with the underlying conductors, thereby providing electrical continuity between the conductors through the piercing blade.

SUMMARY OF THE INVENTION

According to some embodiments, an enclosed connection system for mechanically and electrically connecting first and second cables, the cables each including an elongate electrical conductor covered by an insulation layer, includes an insulation piercing connector and an enclosure. The insulation piercing connector includes at least one electrically conductive piercing member and a clamping mechanism. The clamping mechanism is configured and operable to force the at least one piercing member through the insulation layers of the first and second cables and into electrical engagement with the conductors of the first and second cables to form a connection including the insulation piercing connector and the first and second cables wherein the conductors of the first and second cables are electrically connected to one another through the at least one piercing member. The enclosure is configured to receive and cover the connection and to protect the insulation piercing connector.

According to some embodiments, an enclosure assembly for use with a insulation piercing connector and first and second elongate electrical conductors includes at least one cover member configured or configurable to define an enclosure cavity to receive the insulation piercing connector.

According to method embodiments, a method for forming an enclosed connection assembly about first and second cables, the cables each including an elongate electrical conductor covered by an insulation layer, includes providing an insulation piercing connector including: at least one electrically conductive piercing member; and a clamping mechanism configured and operable to force the at least one piercing member through the insulation layers of the first and second cables and into electrical engagement with the conductors of the first and second cables to form a connection including the insulation piercing connector and the first and second cables wherein the conductors of the first and second cables are electrically connected to one another through the at least one piercing member. The method further includes: selectively operating the clamping mechanism of the insulation piercing connector to force the at least one piercing member through the insulation layers of the first and second cables and into electrical engagement with the conductors of the first and second cables such that the conductors of the first and second cables are electrically connected to one another through the at least one piercing member to thereby form a connection; and covering the connection and protecting the insulation piercing connector with an enclosure.

According to some embodiments, a solar electrical power generation collection system includes a plurality of distributed solar electrical generation devices, a plurality of feed cables each extending from a respective one of the solar electrical generation devices, a trunk cable, and a plurality of enclosed connection systems each mechanically and electrically connecting a respective one of the feed cables to the trunk cable. Each enclosed connection system includes an insulation piercing connector and an enclosure. The insulation piercing connector includes: at least one electrically conductive piercing member; and a clamping mechanism configured and operable to force the at least one piercing member through the insulation layers of the feed and trunk cables and into electrical engagement with the conductors of the feed and trunk cables such that the conductors of the feed and trunk cables are electrically connected to one another through the at least one piercing member. The enclosure is configured to receive and cover the connection and to protect the insulation piercing connector.

According to some embodiments, an enclosure assembly for protecting an electrical connection between a connector and first and second elongate electrical conductors includes a first cover member, a second cover member, a first flowable sealant, and a second flowable sealant. The first cover member defines a first cover member cavity and includes: a first port extension forming a part of the first cover member cavity; a first strain relief slot; and a first openable port wall located between the first port extension and the first strain relief slot. The second cover member defines a second cover member cavity and includes: a second port extension forming a part of the second cover member cavity; a second strain relief slot; and a second openable port wall located between the first port extension and the first strain relief slot. The first flowable sealant is disposed in the first cover member cavity to provide a seal about the connection. The second flowable sealant is disposed in the second cover member cavity to provide a seal about the connection. The first and second cover members are relatively movable between an open position to receive the connection and a closed position wherein the first and second cover members define an enclosure cavity to contain the connection such that the connector is encapsulated in the first and second sealants. The enclosure is configured such that the connector will displace the first and second sealants when the first and second cover members are moved from the open position to the closed position about the connector. When the first and second cover members are in the closed position: the first and second port extensions combine to form a cable port; the first and second strain relief slots combine to form a strain relief opening; the first and second port walls partition the cable port from the strain relief opening; the enclosure is configured to receive the first cable such that the first cable extends from the connection in the enclosure cavity, through the cable port, through the first and second port walls, and through the strain relief opening; the first and second port walls inhibit flow of the first and second flowable sealants from the cable port toward the strain relief opening; and the strain relief opening is configured to receive a portion of the first cable to provide strain relief for the first cable.

According to some embodiments, an enclosure for protecting an electrical connection between a connector and first and second elongate electrical conductors includes first and second cover members, a main latching mechanism, and a safety latch mechanism. The first and second cover members define first and second cover member cavities, respectively. The first and second cover members are pivotally connected by a first hinge. The first and second cover members are relatively pivotable about the first hinge between an open position to receive the connection and a closed position wherein the first and second cover members define an enclosure cavity to contain the connection such that the connector is encapsulated in the first and second cover members. The main latch mechanism includes: a first latch feature forming a part of the first cover member; and a second latch feature forming a part of the second cover member. The safety latch mechanism includes: a safety latch member pivotally connected to the first cover member by a second hinge, the safety latch member including a first safety latch feature; and a second safety latch feature on the second cover member. The first and second latch features are configured to interlock with one another when the first and second members are placed in the closed position. The safety latch member is configured to pivot about the second hinge from a ready position to a safety latching position after the first and second cover members are placed in the closed position. In the safety latching position, the first and second safety latching features are interlocked with one another.

BRIEF DESCRIPTION OF THE DRAWINGS

FIG. 27 is an enlarged, fragmentary, cross-sectional view of the enclosure connection of FIG. 25.

DETAILED DESCRIPTION OF EMBODIMENTS OF THE INVENTION

Figure 1:
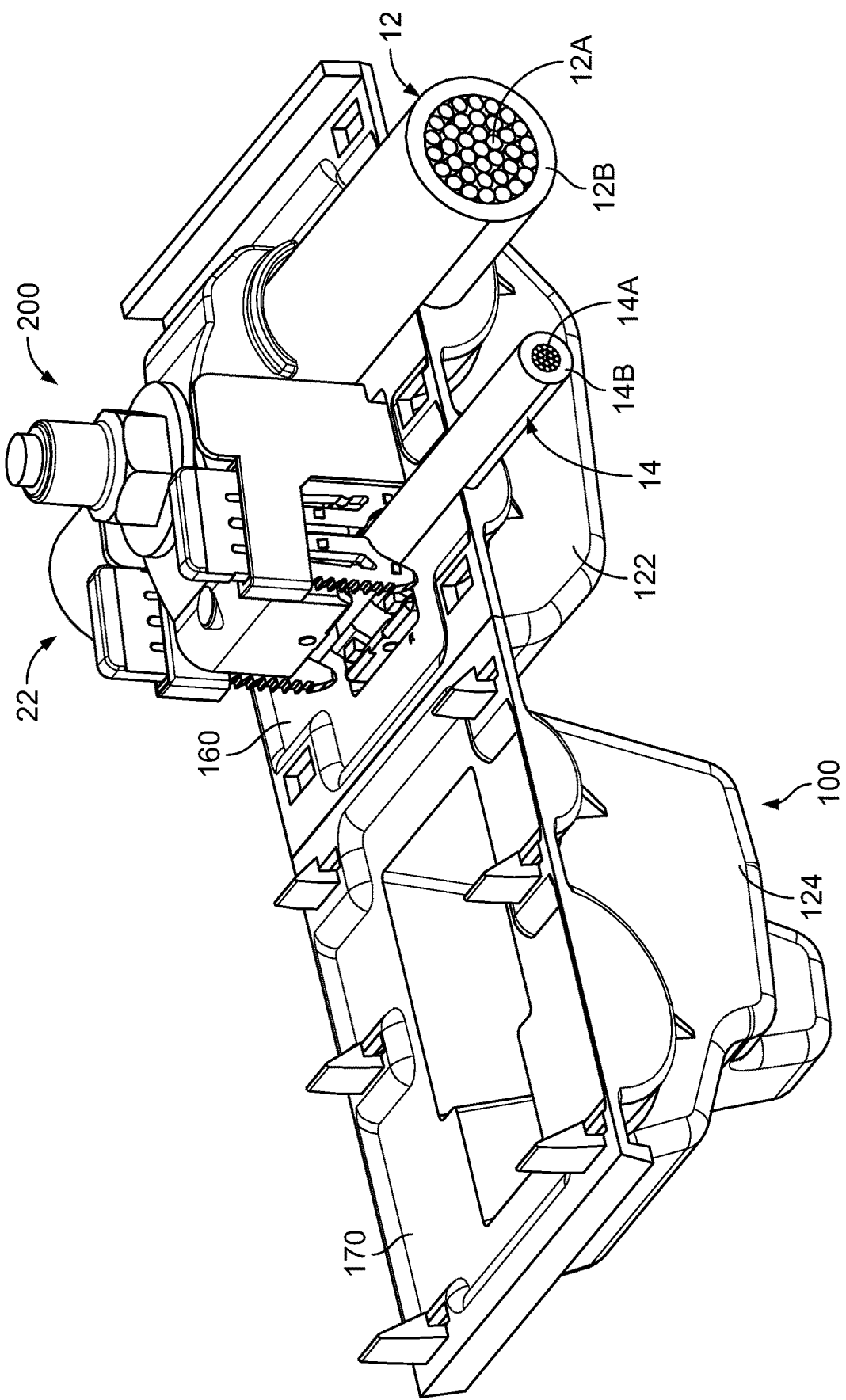
FIG. 1 is a top perspective view of a connector system according to some embodiments in an open position.
Figure 2:
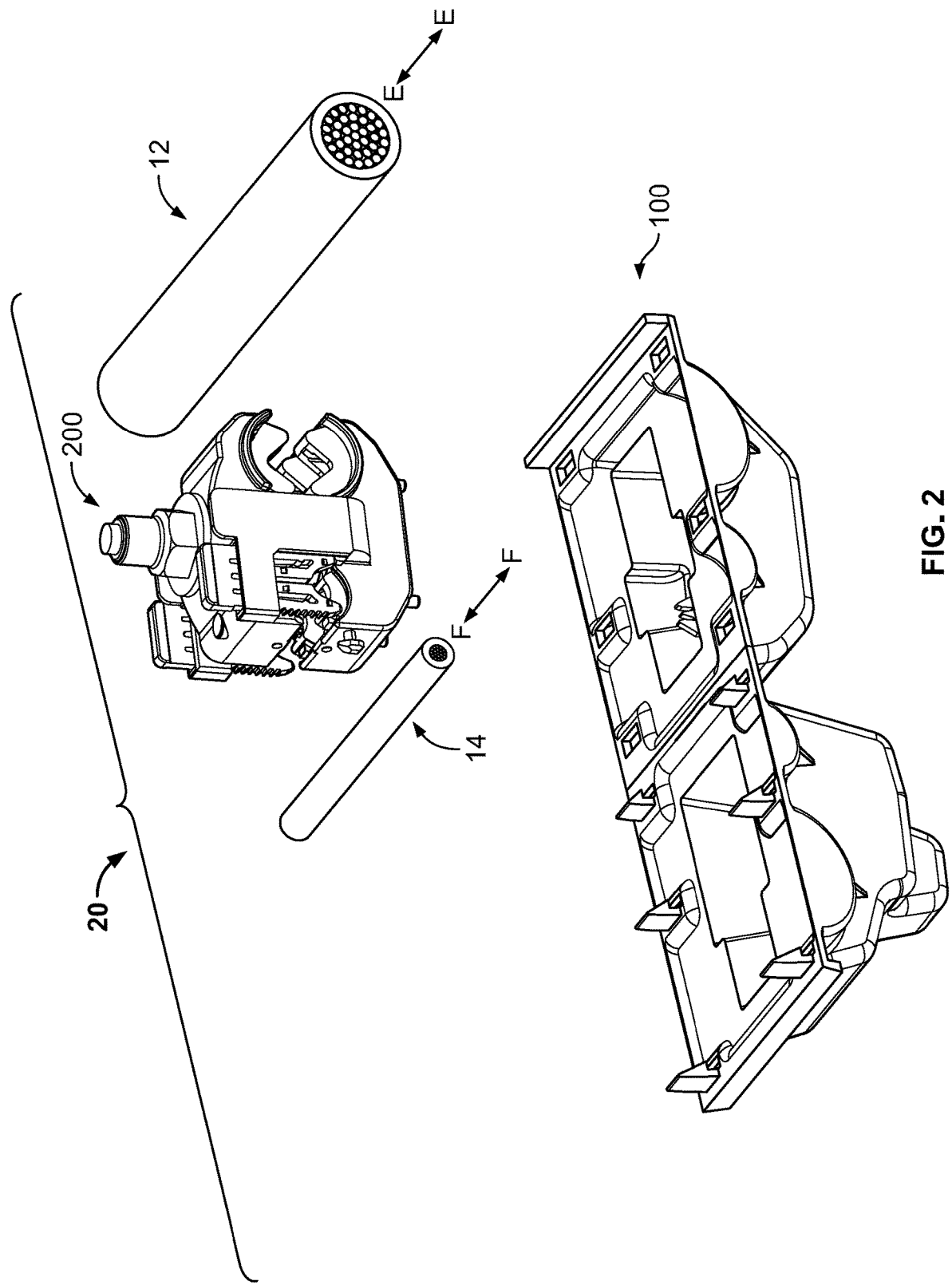
FIG. 2 is an exploded, top perspective view of the connector system of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

As used herein, "monolithic" means an object that is a single, unitary piece formed or composed of a material without joints or seams.

With reference to FIGS. 1-16, a connector system 20 according to embodiments of the present invention may be used to form an enclosed and protected connection assembly 24. The connector system 20 includes an insulation piercing connector 200 (which may be referred to herein as an IPC, IP connector, or IPC connector) and an enclosure assembly 100. The connector 200 can be used to form an IPC connection 22 (FIG. 1) including a pair of elongate conductor cables 12, 14 (e.g., electrical power lines) mechanically and electrically coupled by the connector 200. Generally, and as described in more detail below, a driver 26 (FIG. 14) may be used to secure the connector 200 on the cables 12, 14. The enclosure assembly 100 according to embodiments of the present invention may be installed on and surround the connection 22 to form the enclosed connection assembly 24.

The connector 200 is a multi-cable insulation piercing connector. The connector 100 may be adapted for use as a splice or tap connector for connecting an elongate electrical tap or feed cable 14 to an elongate main cable 12 of a utility power distribution system, for example. The connected cables 12, 14 may be other combinations of cables such as spliced cables.

The second cable 14 may be a known electrically conductive metal high, medium or low voltage cable or line having a generally cylindrical form in an exemplary embodiment. The first cable 12 may also be a generally cylindrical high, medium or low voltage cable line. The cable 14 includes a metal electrical conductor 14A surrounded by an insulation layer 14B. The cable 12 includes a metal electrical conductor 12A surrounded by an insulation layer 12B. One or more of the conductors 12A, 14A may be formed of multiple strands (e.g., parallel or twisted strands) as illustrated in the figures, or may be solid cylindrical conductors (solid wire). Multi-strand conductors may be easier to handle with better bending characteristics. Suitable materials for the conductors 12A, 14A may include aluminum or copper. The insulation layers 12B, 14B may be formed of a polymeric material such as PVC, polypropylene, polyethylene, or cross-linked polyethylene. The conductor 14A and the conductor 12A may be of the same wire gauge or different wire gauge in different applications and the connector 100 is adapted to accommodate a range of wire gauges for the conductor 14A and the conductor 12A. In some embodiments, the conductor 12A has a larger cross-sectional diameter than the conductor 14A. The cable 12 has a lengthwise axis E-E and the cable 14 has a lengthwise axis F-F.

When installed on the first cable 12 and the second cable 14, the connector 200 provides electrical connectivity between the conductor 12A and the conductor 14A. This connection may be used to feed electrical power from the main conductor 12A to the tap conductor 14A in, for example, an electrical utility power distribution system. Or, as discussed below with reference to FIG. 17, the connection may be used to feed electrical power to the main conductor 12A from a feed conductor 14A in an electrical power generation system, for example. The power distribution or generation system may include a number of main cables of the same or different wire gauge, and a number of tap or feed cables of the same or different wire gauge.

Figure 14:
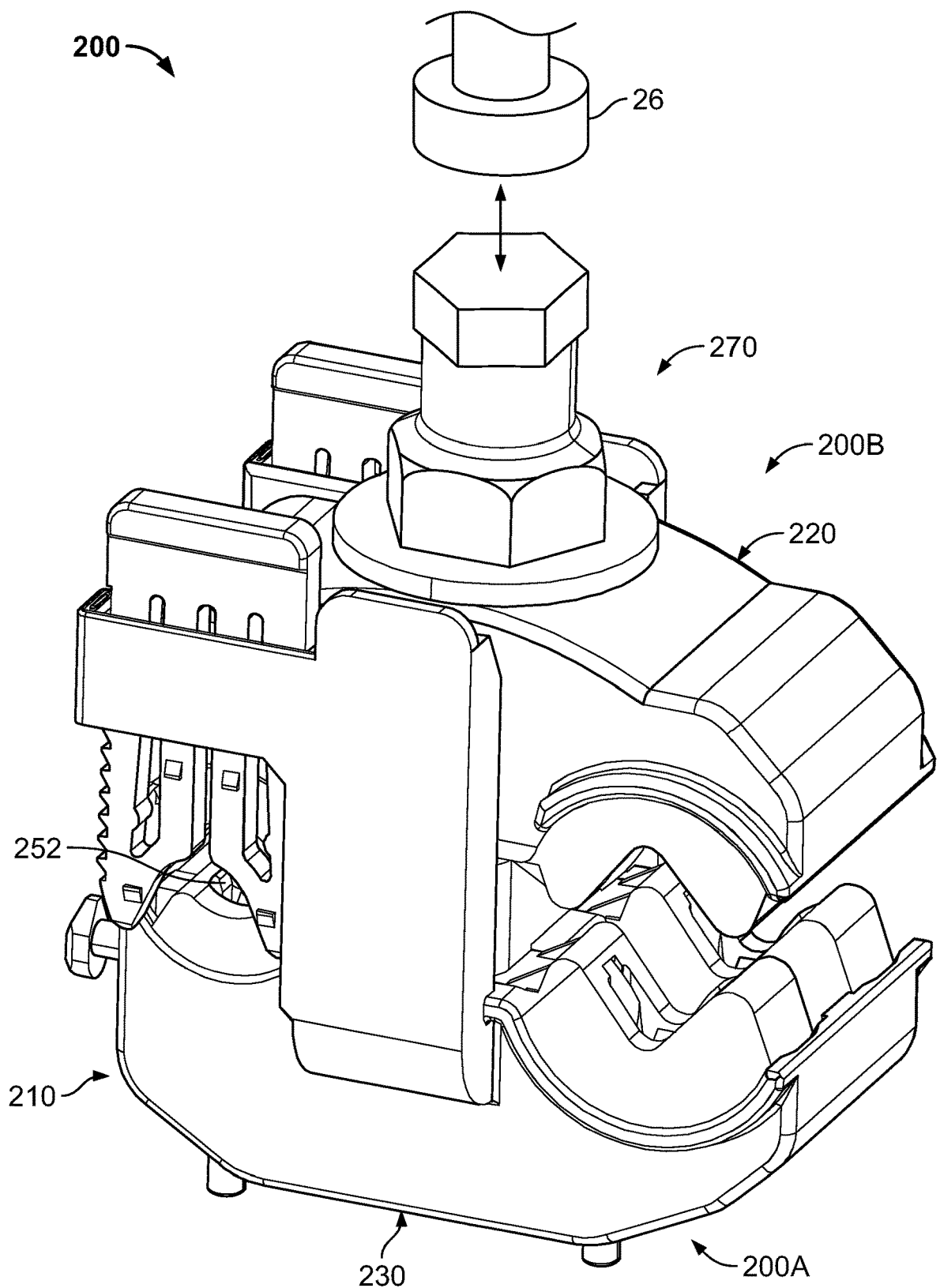
FIG. 14 is a top perspective view of an insulation piercing connector forming a part of the connector system of FIG. 1.
Figure 15:
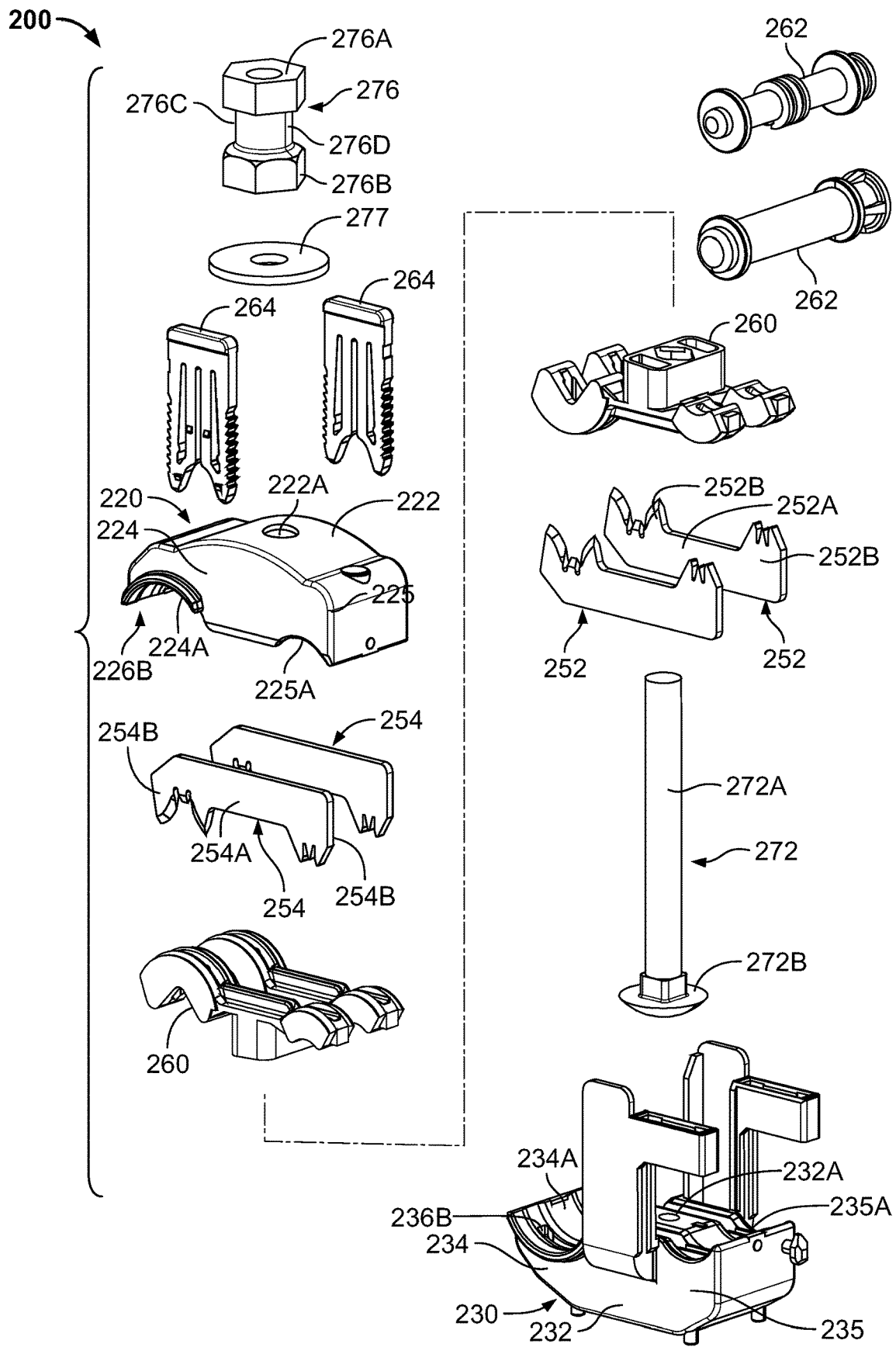
FIG. 15 is an exploded, top perspective view of the insulation piercing connector of FIG. 14.
Figure 16:
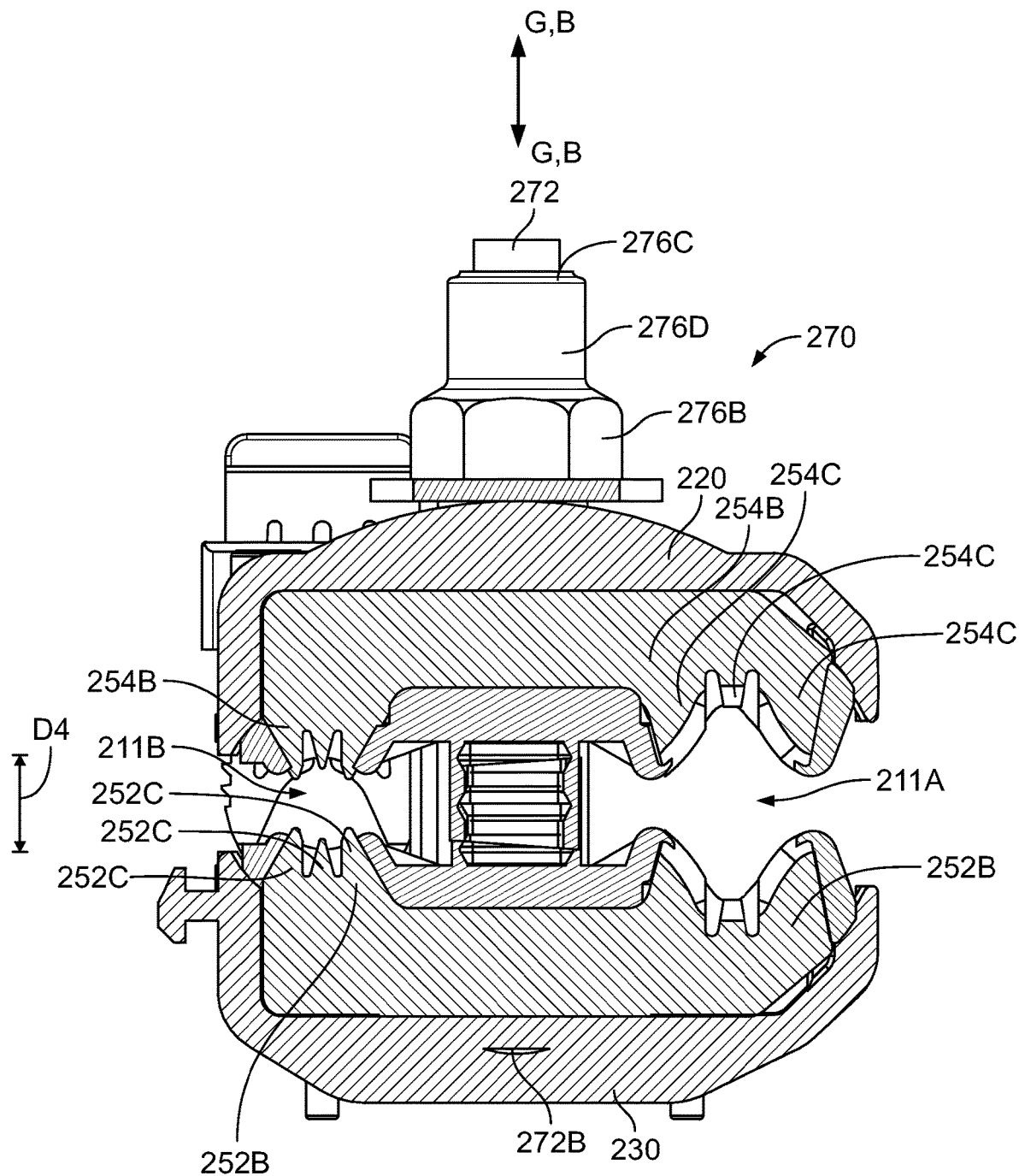
FIG. 16 is a side view of the insulation piercing connector of FIG. 14.

With reference to FIGS. 14-16, the connector 200 includes a connector body assembly 210, a first pair of blade members 252 (hereinafter, the "lower blade members"), a second pair of blade members 254 (hereinafter, the "upper blade members"), seal members 260, cable end caps 262, end cap retainers 264 and a clamping or compression mechanism 270. The connector 200 has a longitudinal axis G-G.

The connector body assembly 210 includes a first or upper body member 220, and a second or lower body member 230.

The upper body member 220 includes a support portion 222 and a pair of laterally opposed legs or jaw portions 224, 225 extending laterally from the support portion 222 with respect to the connector axis G-G. The support portion 222 includes a bore 222A. The jaw portion 224 includes a cable groove or seat 224A. The jaw portion 225 includes a cable groove or seat 225A. The jaw portion 224 further includes, in the cable seat 224A, a pair of blade slots or seats 224B. The jaw portion 225 further includes, in the cable seat 225A, a pair of blade slots or seats 226B.

The lower body member 230 includes a support portion 232 and a pair of laterally opposed legs or jaw portions 234, 235 extending laterally from the support portion 232 with respect to the connector axis G-G. The support portion 232 includes a bore 232A. The jaw portion 234 includes a cable groove or seat 234A. The jaw portion 235 includes a cable groove or seat 235A. The jaw portion 234 further includes, in the cable seat 234A, a pair of blade slots or seats 234B. The jaw portion 235 further includes, in the cable seat 235A, a pair of blade slots or seats 236B.

The jaw portion 224 and the jaw portion 234 define a first or main side cable receiving slot 211A therebetween. The jaw portion 225 and the jaw portion 235 define a second or tap side cable receiving slot 211B therebetween.

The body members 220, 230 may be formed of any suitable material. According to some embodiments, the body members 220, 230 are formed of a polymeric material. In some embodiments, the polymeric material is selected from the group consisting of polyamide (PA) 6.6, PA 6.6 reinforced with glass fibers or talc, polycarbonate, or polycarbonate blend. The body members 220, 230 may be formed using any suitable technique. According to some embodiments, the body members 220, 230 are molded. According to some embodiments, the each of the body members 220, 230 is monolithic and unitarily formed.

The compression mechanism 270 includes a bolt 272, and a torque control member in the form of a nut 276. A washer 277 may be provided between the nut 276 and the upper body member 220. However, other types of compression mechanisms may be used for the compression mechanism 270. For example, the compression mechanism may include an inclined surface device operable to provide mechanical advantage, for example.

The bolt 272 may be a carriage bolt and includes a threaded shank 272A, and a head 272B.

In some embodiments and as shown, the nut 276 is a shear nut including a shear head 276A, a base portion 276B, a shear or breakaway section 276C coupling the portions 276A and 276B, and a tubular, internally threaded connecting section 276D extending from the base portion 276B to the breakaway section 276C.

The bolt 272 extends through the bores 222A, 232A and is axially constrained by the bolt head 272B and the body member 230. The nut 276 is rotatably mounted on the bolt 272 and is axially constrained by the body member 220. The bores 222A, 232A may be round, or elongated, so that the upper connector body can rock as it is torqued down against two conductors with different outer diameters.

The axial spacing distance D4 (FIG. 16) between the cable seats 224A, 234A and 225A, 235A can be varied. The body member 220 can slide up and down the bolt 272 relative to the lower body member 230 another along a slide axis B-B. Accordingly, the heights of the slots 211A, 211B can be independently varied.

In use, the shear head 276A of the nut 276 is engaged by a driver and forcibly rotated thereby. The shear head 276A may be faceted or otherwise shaped to mate with the tool. The nut 276 is thereby rotated relative to the axially and bolt 272, which may be rotationally constrained by a tool or an anti-rotation feature or mechanism of the connector 200. This causes the bolt 272 to translate up through the nut 276, which slides or translates the body portions 220 and 230 together (in respective converging directions) along the slide axis B-B. The shear head 276A will shear off of the base portion 276B at the breakaway section 276C when subjected to a prescribed torque. The base portion 276B may be faceted or otherwise configured to mate with a tool to enable loosening of the nut 276 to permit removal of the connector 200 from the cables.

According to some embodiments, the bolt 272 and the nut 276 may be formed of any suitable materials, such as steel (e.g., galvanized steel or stainless steel), aluminum alloy, plastic or zinc alloy.

Each lower blade member 252 is mounted in one of the blade slots 236B for movement with the upper body member 230. Each lower blade member 252 includes a body or base 252A having laterally opposed ends. Each end is provided with an integral cable engagement or insulation piercing feature 252B. Each insulation piercing feature 252B includes a plurality of serrations or teeth 252C separated by slots and having terminal points. The points of the teeth 252C may collectively lie on an arc generally corresponding to the profile of the arcuate outer surface of the corresponding cable conductor 12A, 14A.

Each upper blade member 254 is mounted in one of the blade slots 226B for movement with the upper body member 220. Each main blade member 254 includes a body or base 254A having axially opposed ends. Each end is provided with an integral cable engagement or insulation piercing feature 254B. Each insulation piercing feature 254B includes a plurality of serrations or teeth 254C separated by slots and having terminal points. The points of the teeth 254C may collectively lie on an arc generally corresponding to the profile of the arcuate outer surface of the corresponding cable conductor 12A, 14A.

The blade members 252, 254 are affixed in their respective blade seats such that the teeth 254C of the blade members 254 face the teeth 252C of the blade members 252.

According to some embodiments, the width of each blade member 252, 254 is at least ten times its thickness. According to some embodiments, the thickness of each the blade member 252, 254 is in the range of from about 0.05 and 0.125 inch.

The blade members 252, 254 may be formed of any suitable electrically conductive material. According to some embodiments, the blade members 252, 254 are formed of metal. According to some embodiments, the blade members 252, 254 are formed of aluminum, aluminum alloy, or copper and may be galvanized. The blade members 252, 254 may be formed using any suitable technique. According to some embodiments, each blade members 252, 254 is monolithic and unitarily formed. According to some embodiments, each blade member 252, 254 is extruded and cut, stamped (e.g., die-cut), cast and/or machined.

Figure 3:
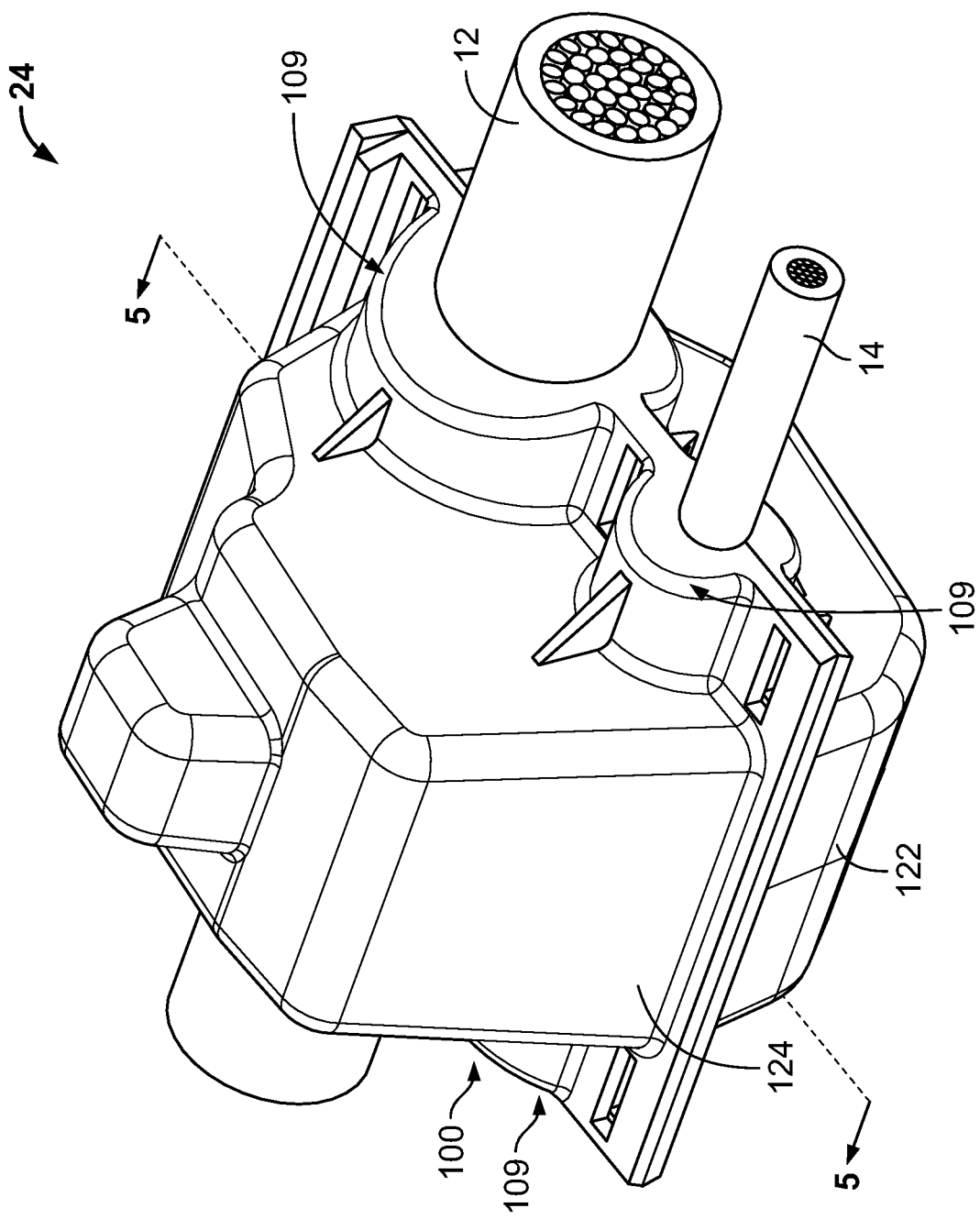
FIG. 3 is top perspective view of an enclosed connection assembly including the connector system of FIG. 1.
Figure 4:
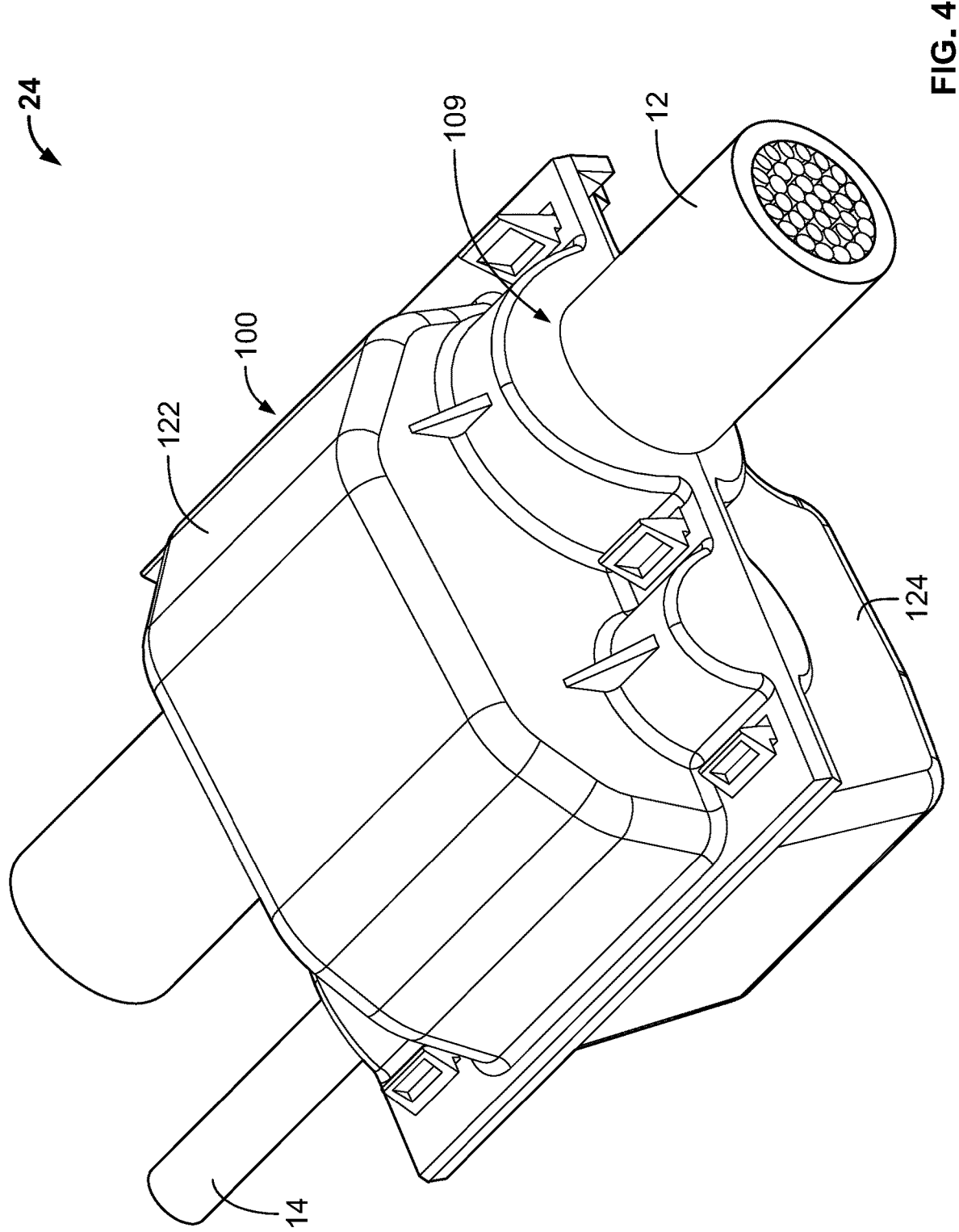
FIG. 4 is bottom perspective view of the enclosed connection assembly of FIG. 3.

The sealant-filled enclosure 100 includes a housing 120 and masses of sealant 160, 170 disposed therein. According to some embodiments, and as discussed in more detail below, the sealant 160, 170 may be a gel. The housing 120 includes a first shell or cover member 122 and a second shell or cover member 124 joined to one another by a hinge 126 and adapted to move between an open position as shown in FIG. 1 and a closed position as shown in FIG. 3. In other embodiments, the cover members 122, 124 are not hinged. In the open position, the enclosure assembly 100 can receive the connection 22 and adjacent portions of the cables 12, 14. In the closed position, the enclosure assembly 100, including the masses of sealant 160, 170, may operate to seal about and protect the connection 22. In the closed position, the enclosure assembly 100 defines an enclosure cavity 106 (FIG. 10) and opposed pairs of ports 109 (FIG. 6) communicating with the enclosure cavity 106. The shape or geometry of the enclosure cavity 106 resembles or substantially conforms that of the connector 200.

Turning to the housing 120 in more detail, the cover members 122, 124 are constructed in generally the same manner, except for the shapes of their cavities, the shapes of their outer profiles, and the configurations of their latch structures.

Each cover member 122, 124 includes a bottom wall 130. Opposed side walls 132 and opposed end walls 134 extend upwardly from the bottom wall 130. Opposed pairs of port extensions 140 extend longitudinally from either end of each cover member 122, 124. Each port extension 140 is terminated by a port wall 142. Each part wall 142 is configured and constructed to be opened or displaced to receive a cable in the port extension 140. In some embodiments, the port wall 142 is a breakaway wall. In some embodiments, the port walls 142 are frangible (i.e., the port wall 142 is constructed to be broken open and away by breaking (e.g., tearing) the port wall 142). For example, the port walls 142 may include corrugations comprising a series of fingers joined by relatively thin membranes as shown, and the port wall 142 may be opened by tearing two or more of the fingers apart at one or more of the membranes.

The upper edges of the walls 132, 134 form a perimeter edge 138 defining an opening. The walls 130, 132, 134 and the port extensions 140 of each cover member 122, 124 define an overall cover member chamber or cavity 136 and a front opening 130A communicating with cavity 136. The cavity 136 includes a main cavity portion 136A and conductor port subchannels 136B defined within each port extension 140.

The cover member 124 further includes a dome 125 defined in its bottom wall 130. The dome 125 defines an extension cavity 125A. The extension cavity 125A is contiguous with and communicates with the main cavity 136 of the cover member 124.

The cover members 122, 124 are pivotably joined by the hinge 126. According to some embodiments, the hinge 126 is a flexible, living hinge. A living hinge may allow for unitary formation of the housing 120, as well as possible cost savings in materials and assembly. Alternatively, other hinge configurations may be employed. For example, the hinge 126 may be replaced by or supplemented with interlocking pivotally coupled hinge structures and/or a pivot pin. Alternatively, the cover members 122, 124 may be non-hinged.

The housing 120 includes a latch system including six integral latch mechanisms 181-186. The latch mechanisms 181-186 include latch fingers 181A-186A, respectively, on and projecting inwardly from the cover member 124. The latch mechanisms 181-186 further include latch slots or openings 181B-186B, respectively, in the cover member 122. The latch fingers 181A-186A may be integrally formed with the cover member 124. The latch fingers 181A-186A and openings 181B-186B can be selectively engaged, whereupon they cooperate to releasably secure the cover members 122, 124 in a closed configuration as shown in FIG. 3.

Figure 13:
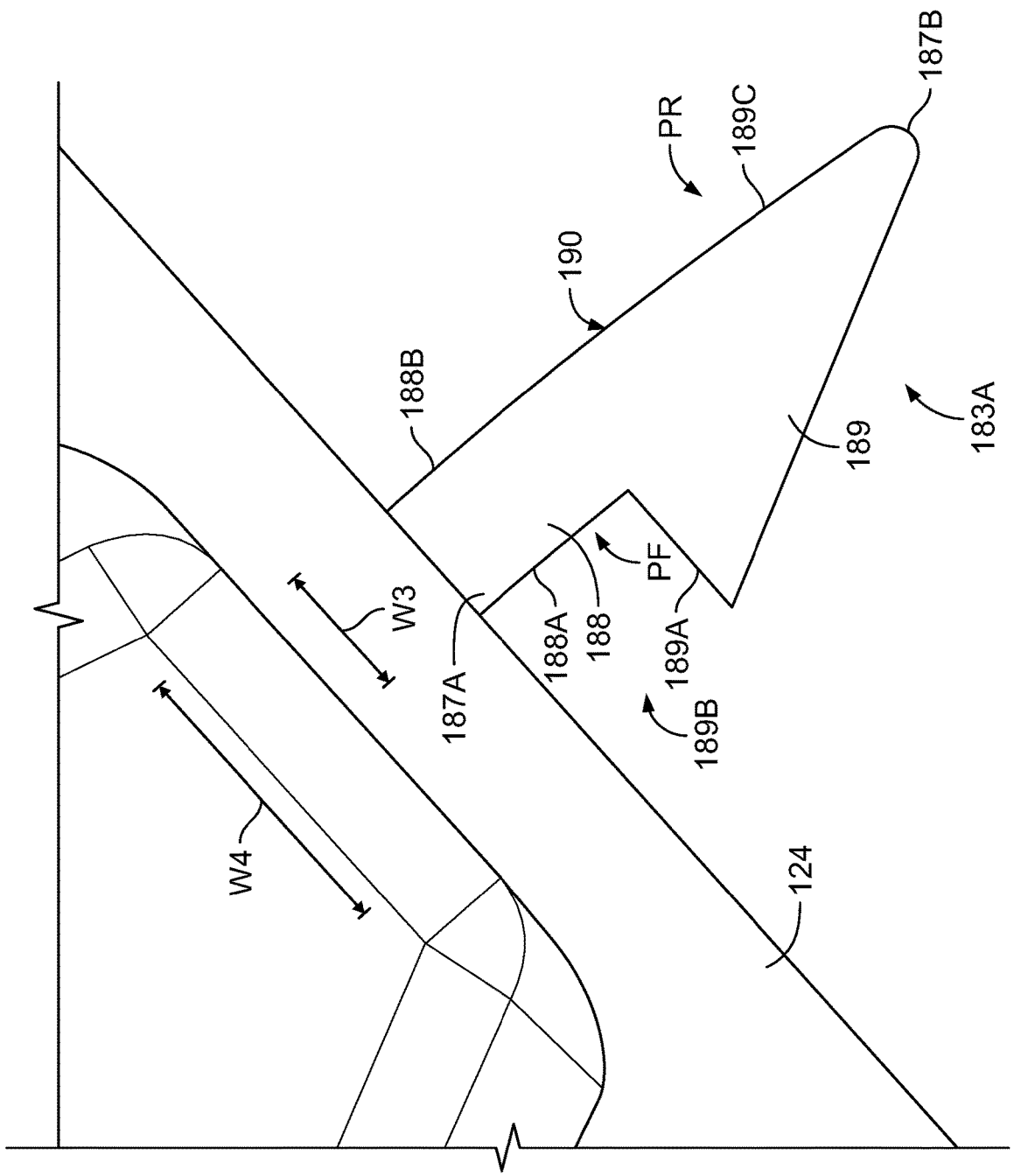
FIG. 13 is an enlarged, fragmentary, side view of the housing of FIG. 11.

The latch fingers 181A-186A each have generally the same configuration except in their dimensions and relative proportions. The latch finger 183A will be described in more detail below (FIG. 13). However, it will be appreciated that this description likewise applies to each of the other latch fingers 181A, 182A, 184A, 185A, 186A, except as discussed herein.

The latch finger 183A has an inner or base end 187A, an outer or lead end 187B, a base section 188, and a barb or interlock section 189. The base section 188 extends from the base end 187A at the perimeter 138 of the cover member 124 to the interlock section 189. The interlock section 189 extends from the base section 188 to the lead end 187B.

The base section 188 has a reduced width W3 defined between a front edge 188A and a rear edge 188B.

The interlock section 189 has an extended ledge surface 189A that projects widthwise beyond the inner edge 188A to define a socket, recess, or slot 189B between the ledge 189A and the perimeter 138. The interlock section 189 has a width W4 at the extended ledge surface 189A that is greater than the width W3 of the base section 188. The interlock section 189 is tapered from the lead end 187B to the ledge 189A.

The interlock section 189 also has a rear edge 189C. The rear edges 188B and 189C collectively form a finger rear edge 190.

Figure 12:
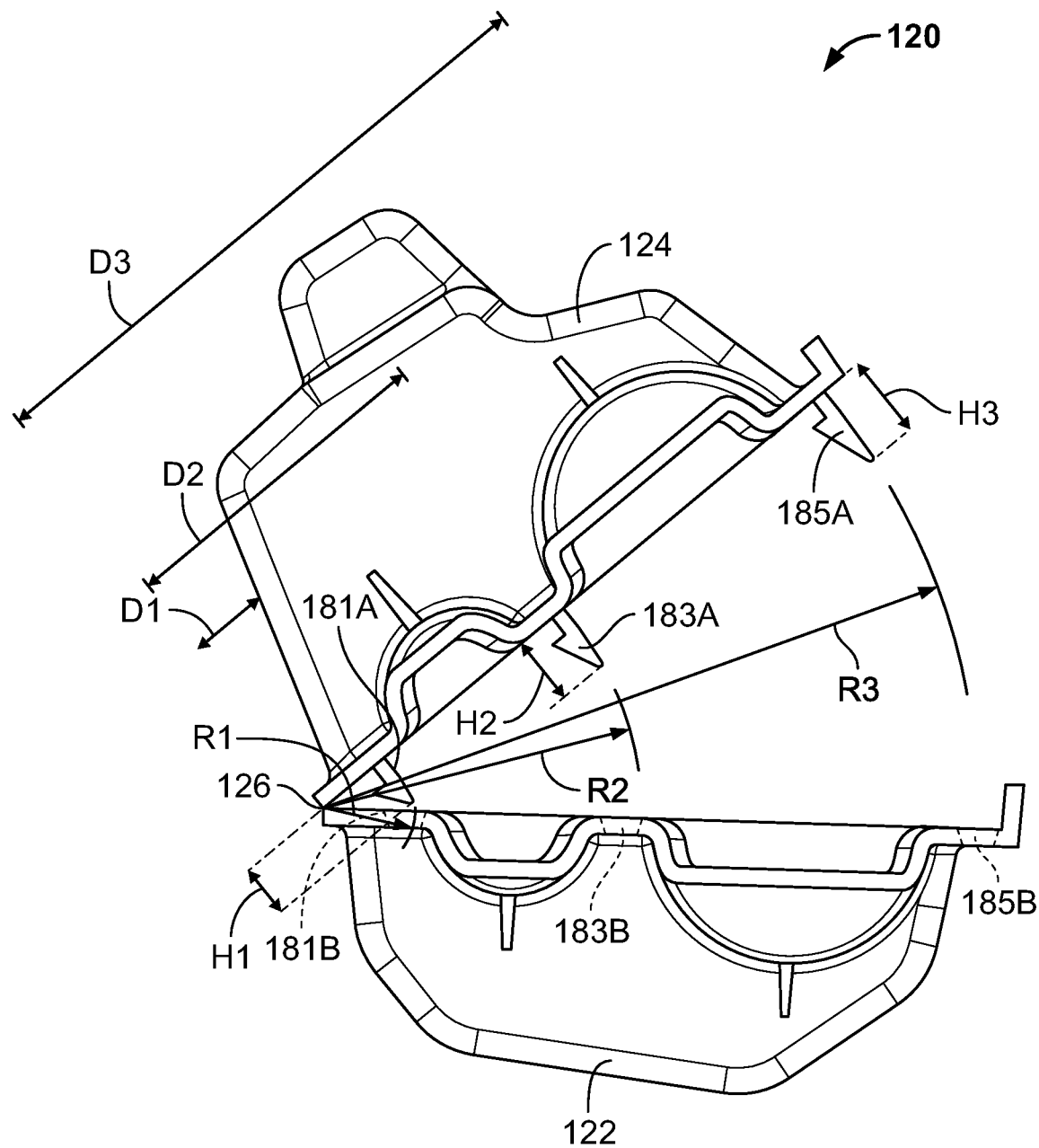
FIG. 12 is a side view of the housing of FIG. 11 in a partially closed position.

The finger rear edge 190 has a convexly curved, arcuate or rounded profile PR (with respect to the edge of the cover member 124 distal from the hinge 126). According to some embodiments, the radius of curvature of the profile PR is centered at or substantially at the hinge axis H-H of the hinge 126, as illustrated in FIG. 12.

The front edge 188A of the base section 188 may also have a convexly curved or rounded profile PF (with respect to the edge of the cover member 124 distal from the hinge 126, or concavely curved when viewed from the hinge side). According to some embodiments, the radius of curvature of the profile PF is also centered at or substantially at the hinge axis H-H.

In some embodiments, the finger rear edge 190 of each of latch finger 181A-186A has a convexly curved profile as described. In some embodiments, each of these finger rear edge profiles PR has a respective radius of curvature R1, R2, or R3 (FIG. 12) that is centered at or substantially at the hinge axis H-H. The radius of curvature R1, R2, R3 of each latch finger 181A-186A will depend on the distance of the respective latch finger 181A-186A from the hinge axis H-H. However, the radii of curvature R1, R2, R3 are concentric with the hinge axis H-H.

In other embodiments, some of the latch fingers 181A-181B may be formed with rear edges that are not curved as described above.

Similarly, the front edges 188A of each of the base sections 188 of the latch fingers 181A-186A may also have a convexly curved profile PF. In some embodiments, each of these front edge profiles PF has a respective radius of curvature that is centered at or substantially at the hinge axis 126. Again, the front edge radius of curvature of each latch finger 181A-186A will depend on the distance of the respective latch finger 181A-186A from the hinge axis H-H. However, the radii of curvature are concentric with the hinge axis.

Each pair of latch fingers 181A-186A are located a different prescribed transverse distance from the hinge axis H-H. More particularly, the latch fingers 181A and 182A are located a distance D1 (FIG. 12) from the hinge axis H-H, the latch fingers 183A and 184A are located a distance D2 from the hinge axis H-H, and the latch fingers 185A and 186A are located a distance D3 from the hinge axis H-H. The distance D3 is greater than the distance D2, and the distance D2 is greater than the distance D1.

Furthermore, in some embodiments, at least one pair of the latch fingers 181A-186A has a different height than that of the other pairs of the latch fingers 181A-186A. In some embodiments and as shown, each pair of latch fingers 181A-186A has a different height selected such that the lead ends 187B of all of the latch fingers 181A-186A begin entering their respective latch openings 181B-186B at substantially the same time as the cover members 122, 124 are closed. More particularly, the latch fingers 181A and 182A have a height H1, the latch fingers 183A and 184A have a height H2, and the latch fingers 185A and 186A have a height H3. The height H3 is greater than the height H2, and the height H2 is greater than the height H1. In some embodiments, the heights of the base sections 188 of each latch finger 181A-186A are the same, and the different heights H1, H2, H3 are attributable to different height (lengths) of the interlock sections 189.

As a result of the differing latch finger heights discussed above, the latch fingers 181A-186A will begin entering their respective latch openings 181B-186B at substantially the same time as the cover members 122, 124 are closed. In some embodiments, the latch fingers 181A-186A will begin engage and interlock with their respective latch openings 181B-186B at substantially the same time as the cover members 122, 124 are closed.

A pattern of integral ribs 148 is provided on and project inwardly from the interior surface of each bottom wall 130. In some embodiments, each rib 148 has a height H9 (FIG. 10) in the range of from about 0.025 to 0.125 inch. In some embodiments, a plurality of the ribs 148 extend transversely to others of the ribs 148 to form a matrix pattern as shown, for example.

The housing 120 may be formed of any suitable material. According to some embodiments, the housing 120 is formed of an electrically insulative material. In some embodiments, the housing 120 is formed of a vacuum formed or molded polymeric material. The housing 120 may be formed of polypropylene, nylon, polyethylene, ABS and/or PMMA. The housing 120 may be formed of a flame retardant material. The housing material may be any color or transparent.

Prior to use, the sealant 160 may be contained in the cavity 136 of the cover member 122 such that a main sealant portion 162 (FIG. 8) of the sealant is disposed in the main cavity 136 and port sealant portions 166 are disposed in the port subchannels 136B.

According to some embodiments, a void 164 (FIG. 8) is pre-formed or defined in the sealant 160. According to some embodiments, the void 164 is open to the opening 130A. According to some embodiments, the sealant 160 fully surrounds the remainder of the void 164 so that the void 164 is spaced apart from cover member 122 (by the sealant 160) on all sides except the top side. According to some embodiments, the sealant 160 fills the cover member cavity 136 (not including the volume of the void 164) to a level near but not fully to the perimeter edge 138. In other embodiments, the sealant 160 fills the cover member cavity 136 of the cover member 122 substantially fully up to the perimeter edge 138 or to any other desired level. According to some embodiments, the void 164 has sloped side walls that taper outwardly in a direction from the bottom wall 130 to the opening 130A.

According to some embodiments, the void 164 is shaped to conform to the lower half of the connector 200. However, the void 164 may be of any other suitable shape.

Prior to use, the sealant 170 may be contained in the cavity 136 of the cover member 124 such that a main sealant portion 172 (FIG. 8) of the sealant is disposed in the main cavity 136 and port sealant portions 176 (FIG. 8) are disposed in the port subchannels 136B.

According to some embodiments, a void 174 is pre-formed or defined in the sealant 170. According to some embodiments, the void 174 is open to the opening 130A. According to some embodiments, the sealant 170 fully surrounds the remainder of the void 174 so that the void 174 is spaced apart from cover member 124 on all sides except the top side. According to some embodiments, the sealant 170 fills the cavity 136 of the cover member 124 to a level near but not fully to the perimeter edge 138. In other embodiments, the sealant 170 fills the cover member cavity 136 (not including the volume of the void 174) substantially fully up to the perimeter edge 138 or to any other desired level. According to some embodiments, the void 174 has sloped side walls that taper outwardly in a direction from the bottom wall 130 to the opening 130A.

According to some embodiments, the void 174 is shaped to conform to the upper half of the connector 200. However, the void 174 may be of any other suitable shape. The void 174 includes a main section 174A proximate the opening 130A, and also a supplemental section 174B on a side of the main section 174A opposite the opening 130A. In some embodiments, the supplemental section 174B is located in the 125A cavity.

The sealants 160, 170 may be any suitable sealants. According to some embodiments, the sealants 160, 170 are gel sealants. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in U.S. Pat. No. 4,600,261 to Debbaut (hereinafter "Debbaut '261") and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J., light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer or like machine, having a load cell to measure force, a 5 gram trigger, and ¼ inch (6.35 mm) stainless steel probe. For measuring the hardness, for example, of a 20 mL glass vial containing 12 grams of gel, the probe is forced into the gel at the speed of 0.2 mm/sec to a penetration distance of 4.0 mm. The hardness of the gel is the force in grams required to force the probe at that speed to penetrate the gel specified for 4.0 mm. Higher numbers signify harder gels.

The tack and stress relaxation are read from the stress curve generated by tracing the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$1. \frac{(F_i - F_f)}{F_i} \times 100\%$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 70 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram.

While, in accordance with some embodiments, the sealants 160, 170 are gels as described above, other types of sealants may be employed. For example, the sealants 160, 170 may be silicone grease or hydrocarbon-based grease.

The enclosure assembly 100 may be formed in the following manner. The cover members 122, 124 and the hinge 126 may be integrally formed. According to some embodiments, the cover members 122, 124 and the hinge 126 are unitarily molded. According to some embodiments, the entirety of the housing 120 is unitarily molded. The housing 120 may be injection molded or vacuum formed, for example. According to other embodiments (e.g., if the cover members are not hinged), the cover members 122, 124 are separately molded or otherwise formed. According to some embodiments, the cover members 122, 124 and the hinge 126 are monolithic.

Figure 18:
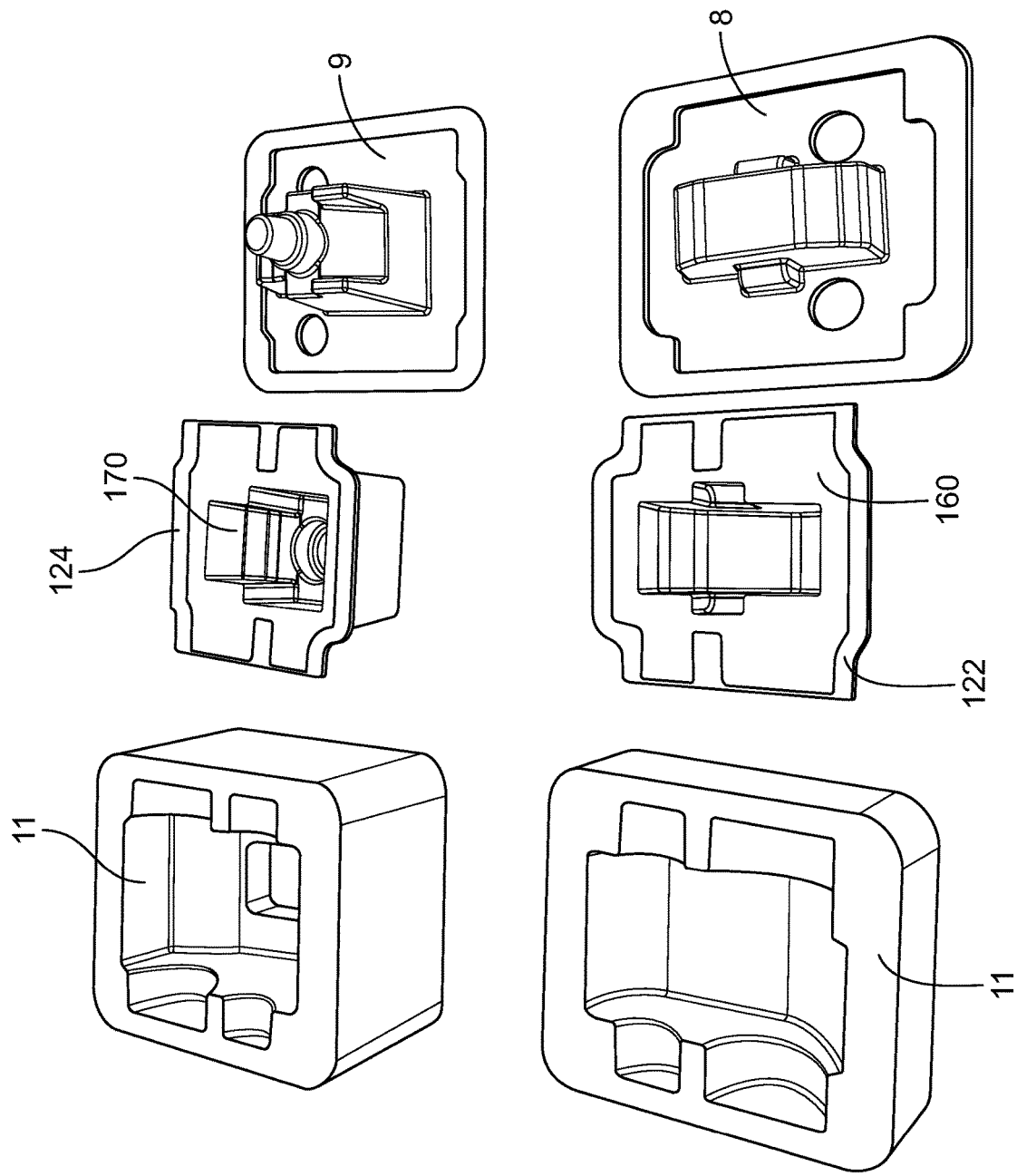
FIG. 18 is a top perspective view illustrating manufacture of the enclosure assembly of FIG. 7.
Figure 19:
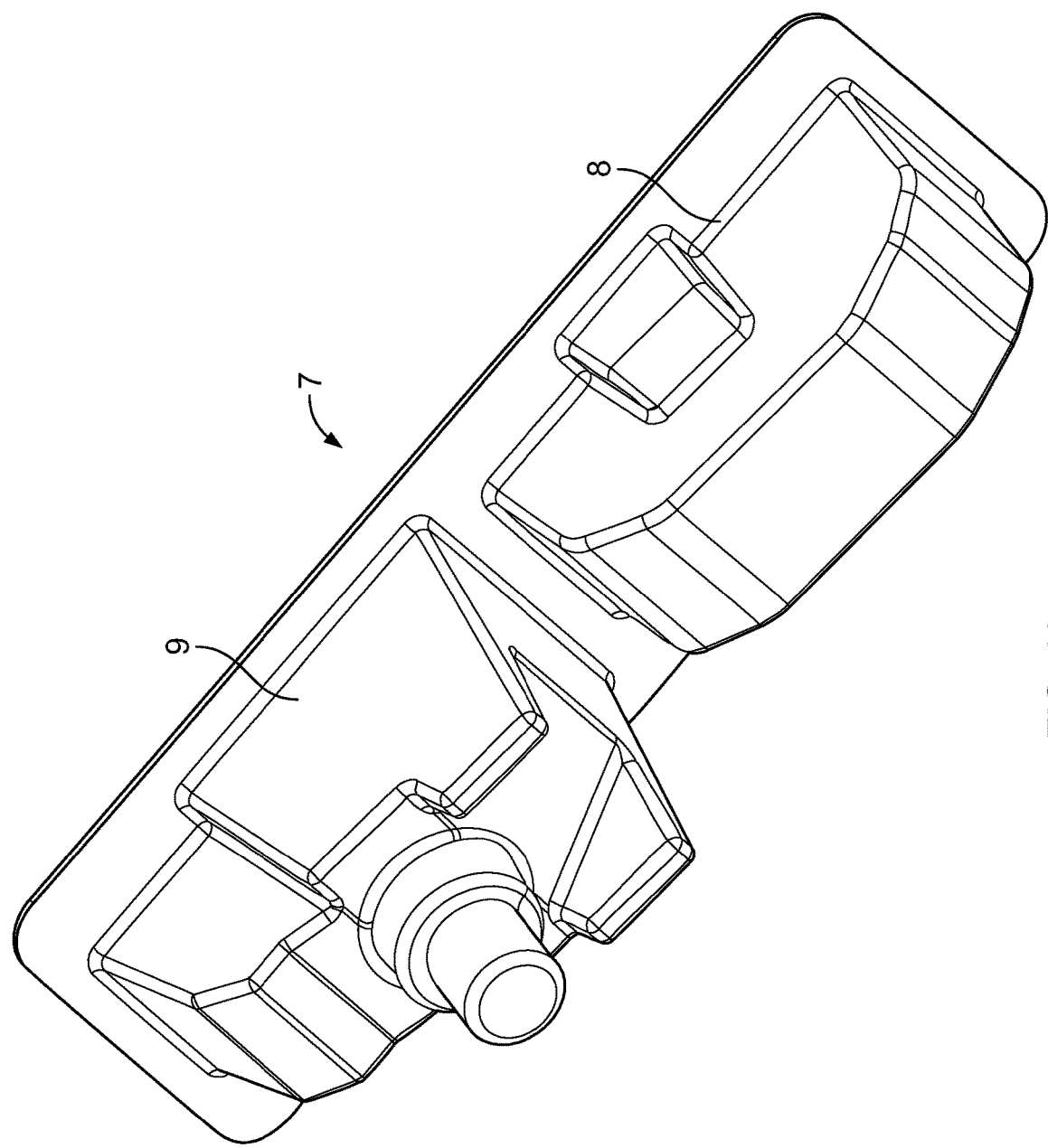
FIG. 19 is a bottom perspective view of an alternative spacer insert for manufacture of the enclosure assembly of FIG. 7.

If the sealant 160, 170 is a material, such as a curable gel, that requires curing, the sealant may be cured in situ. According to some embodiments, and with reference to FIGS. 7, 8, 18 and 19, the sealants 160, 170 may be formed as follows. Spacer inserts 8 and 9 having the shape and size of the voids 164 and 174, respectively, are placed in each the cavities 136 of the cover member 122 and the cover member 124, respectively. The spacer inserts 8, 9 may be provided as separate parts (as shown in FIG. 18) or a unitary part 7 as show in FIG. 19. The housing 120 is oriented so that the cavities 136 are open upwardly. Each cover member 122, 124 may be supported by a holder or base 11 (FIG. 18). Liquid, uncured sealant is dispensed into the cavities 136 such that it fills the cavities 136 of the cover members 122, 124 up to the desired level. The sealant may then be cured in situ. The spacer inserts 8, 9 may be held in place using clips, a jig or the like to properly register the spacer inserts with the cover members 122, 124 and to prevent the spacer inserts 8, 9 from floating out of the liquid sealant. The spacer inserts 8, 9 are then removed to provide the voids 164, 174 in the sealants 160, 170. The liquid, uncured sealant may instead be inserted first and then displaced by insertion of the spacer inserts 8, 9 prior to curing the uncured sealant. As will be apparent to those skilled in the art from the description herein, sealant-filled enclosures of the present invention may be formed by other methods. For example, a pre-cured sealant may be introduced into the cavities 136 (e.g., around the spacer inserts 8, 9).

The connector system 20 can be used as follows in accordance with methods of the present invention to form the enclosed connection 24. Generally, the connection 22 is first formed by installing the connector 200 on the cables 12, 14. Thereafter, the enclosure assembly 100 is installed over the connection 22 and portions of the cables 12, 14.

The connector 200 can be used as follows in accordance with methods of the present invention to form the connection 22.

If necessary, the compression mechanism 270 is loosened or opened to permit the jaw portions 224, 234 and 225, 235 (and thereby the blade members 252, 254) to be separated. The cable 12 (with the insulation layer 12B covering the conductor 12A) is inserted in or between the cable grooves 224A, 234A and the cable 14 (with the insulation layer 14B covering the conductor 14A) is inserted in or between the cable grooves 225A, 235A. The cables 12, 14 can be axially or laterally inserted into the slots defined between the jaws.

The nut 276 is then driven to compress the compression mechanism 270 along the slide axis B-B and thereby drive the jaws 224, 234 and 225, 235 together along a clamping axis parallel to the slide axis B-B. The nut 276 is driven until a prescribed torque is applied. The shear nut 276 is driven via the shear head 276A until a prescribed torque is applied, whereupon the shear head 276A will break off at the shear section 276C, thereby helping to ensure that the proper load is applied to the blade members 252, 254, 256.

As a result, the insulation piercing features 252B, 254B of the opposed pairs of the blade members 252, 254 are driven to converge on and capture the cables 12, 14 therebetween. More particularly, the teeth 252C, 254C of each blade member 252, 254 are forced through the insulation layer 12B and into mechanical and electrical contact with the conductors 12A, 14A. The teeth 252C, 254C embed in the insulation layers 12B, 14B and make electrical and mechanical contact or engagement with the conductors 12A, 12B. In the foregoing manner, the connector 200 is operatively connected to the cables 12, 14 and the conductors 12A, 14A are electrically connected to one another without stripping the insulation layers 12B, 14B.

According to some embodiments, the teeth 252C, 254C embed in the conductors 12A, 14A. According to some embodiments, the teeth 252C, 254C embed into the conductors 12A, 14A a distance of at least about 0.5 mm.

In the foregoing manner, the connection 22 is formed. The blade members 252, 254 provide electrical continuity (i.e., a path for electrical current flow) between the conductors 12A, 14A of the cables 12, 14. The connector 200 mechanically secures the cables 12, 14 relative to one another.

Once the connection 22 has been constructed as described above, the enclosure assembly 100 is installed on the connection 22 and the cables 12, 14. The enclosure assembly 100 may be held in a fully or partially open position as shown in FIG. 1 and the connection 22 may be inserted between the cover members 122, 124. The enclosure assembly 100 is then closed by urging one or both of the cover members 122, 124 to relatively pivot about the hinge 126 into engagement as shown in FIG. 3, such that the latch structures 181A-186A and latch openings 181B-186B are made to interlock in the closed position. The closed housing 120 defines an enclosure cavity 106 including a main enclosure cavity 107 and contiguous port channels 109 (collectively defined by the port extensions 140). The connector 200 is received in the voids 164, 174 of the sealants 160, 170. The connection 22 is encapsulated within the sealant 160, 170, and the sealant 160, 170 and the connection 22 are in turn encapsulated within the housing 120 (i.e., contained within the enclosure cavity 106). The portions of the cables 12, 14 within the connection 22 and extending from the connection 22 and through the port channels 109 to the frangible walls 142 are likewise encapsulated in the sealant 160, 170.

The connection 22 is oriented relative to the cover member 122, 124 such that the lower portion 200A of the connector 200 is received and seats in the void 164, and the upper portion 200B of the connector 200 is received and seats in the main section 174A of the void 174. The upstanding portion 280C of the clamping mechanism 270 (e.g., the projecting portion of the bolt 272 and the nut 276) are received in the supplemental section 174B of the void 174.

According to some embodiments, the connection 22 is first placed in the cover member 122 of the enclosure assembly 100 (as shown in FIG. 1). More particularly, the connector 200 may be placed or seated in the pre-defined void 164 such that the connector 200 may be partially encapsulated in the sealant 160. The cover 124 is then closed on the cover 122 so that the exposed portion of the connector 200 is received in the pre-defined void 174 and so that this portion of the connector 200 is encapsulated in the sealant 170. It will be appreciated that the order may be reversed so that the connector 200 is instead first placed in the cover member 124 before closing the enclosure assembly 100.

Prior to or as the enclosure assembly 100 is closed, the cables 12, 14 may break or splay the frangible walls 142 so that the cables 12, 14 pass therethrough and are generally surrounded thereby. The walls 142 may be angled outwardly so that they tend to be splayed outwardly by the cables 12, 14.

In some embodiments, one or both of the cables 12, 14 has a terminal end that projects from the connector 200. In this case, the projecting cable end may be covered with one of the electrically insulating (e.g., elastomeric) end caps 262 and the end cap 262 can be secured in place using one of the end cap retainers 264. The enclosure 100 and sealants 160, 170 will then form an environmental seal about the end cap 262 which may extend out of the housing 120 through a port 109. In other embodiments and as shown, the end caps 262 are not used.

The configuration of the curved latch fingers 181A-186A as described above assist in keeping the latch fingers 181A-186A properly aligned with the openings 181B-186B and the cover members 122, 124 aligned with one another. Also, the different selected heights H1, H2, H3 as discussed above cause the latch fingers 181A-186A to enter (and, in some embodiments interlock with) their respective latch openings 181B-186B at substantially the same time as the cover members 122, 124 are closed. This also helps to maintain the latch fingers 181A-186A in proper alignment with the openings 181B-186B and the cover members 122, 124 aligned with one another. In this way, the configuration of the latch fingers 181A-186A can ease the installation procedure and reduce the risk of inadvertent damage to the cover assembly.

According to some embodiments and as illustrated, the volumes and configurations of the sealants 160, 170 are selected to ensure that the connection 22 displaces at least one, and according to some embodiments, both of the sealants 160, 170 when the enclosure assembly 100 is transitioned from the opened position to the closed position with the connection 22 disposed therein.

According to some embodiments, the combined volume of the connector 200, the portions of the cables 12, 14 in the enclosure cavity 106, and the sealants 160, 170 is greater than the volume of the enclosure cavity 106.

According to some embodiments and as illustrated, the volume of the enclosure cavity 106 is greater than the combined volume of the sealants 160, 170, but the volume of the enclosure cavity 106 not filled with the sealants 160, 170 is less than the volume of the connection 22 (i.e., the connector 200 and the portions of the cables 12, 14 in the enclosure cavity 106).

According to some embodiments, the combined volume of the voids 164, 174 is less than or equal to the volume of the connector 200. According to some embodiments, the sum of the volumes of the voids 164, 174 is in the range of from about 60 to 100 percent of the volume of the connector 200 and, according to some embodiments, in the range of from about 85 to 95 percent of the volume of the connector 200.

Figure 5:
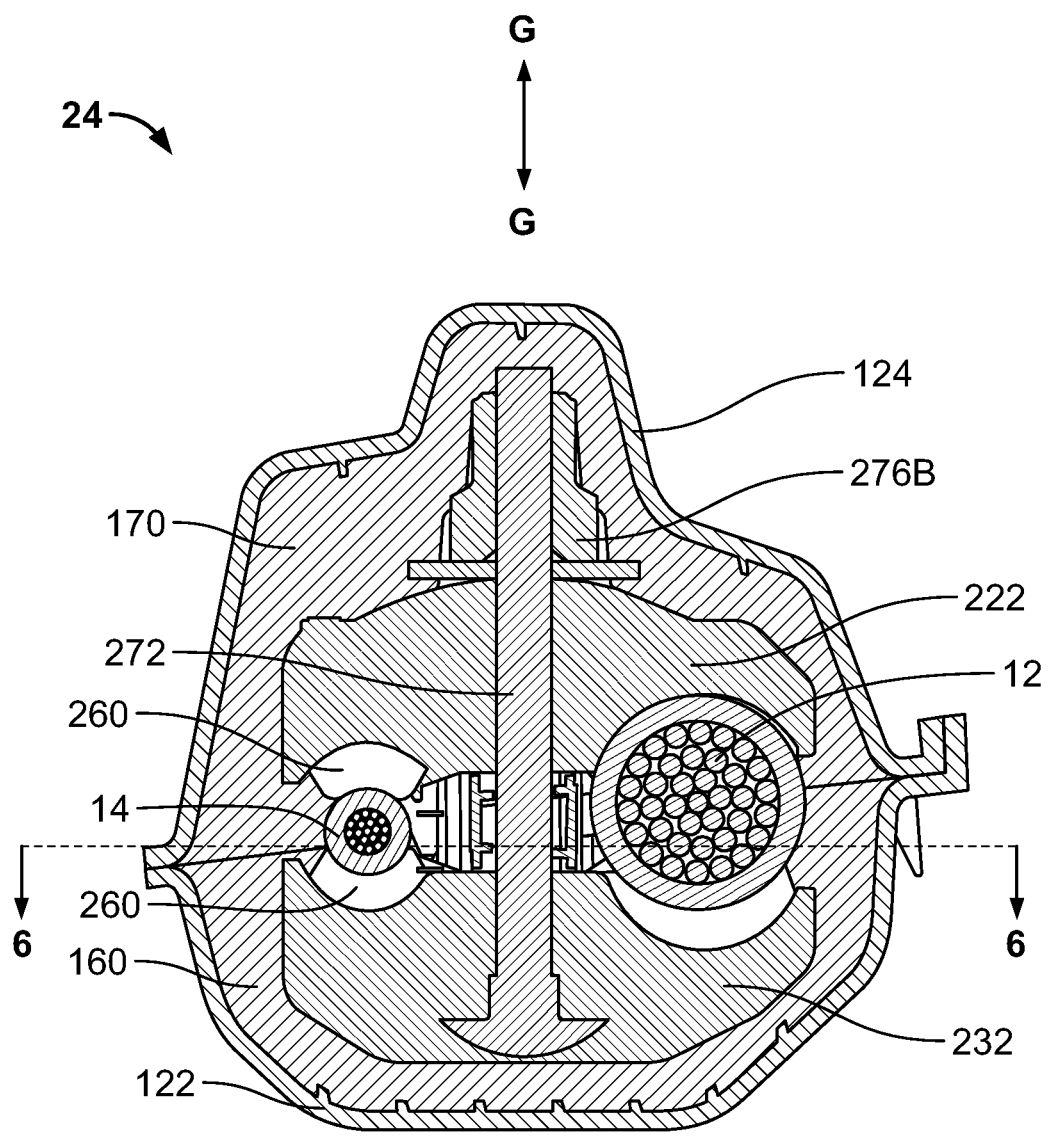
FIG. 5 is a cross-sectional view of the enclosed connection assembly of FIG. 3 taken along the line 5-5 of FIG. 3.
Figure 6:
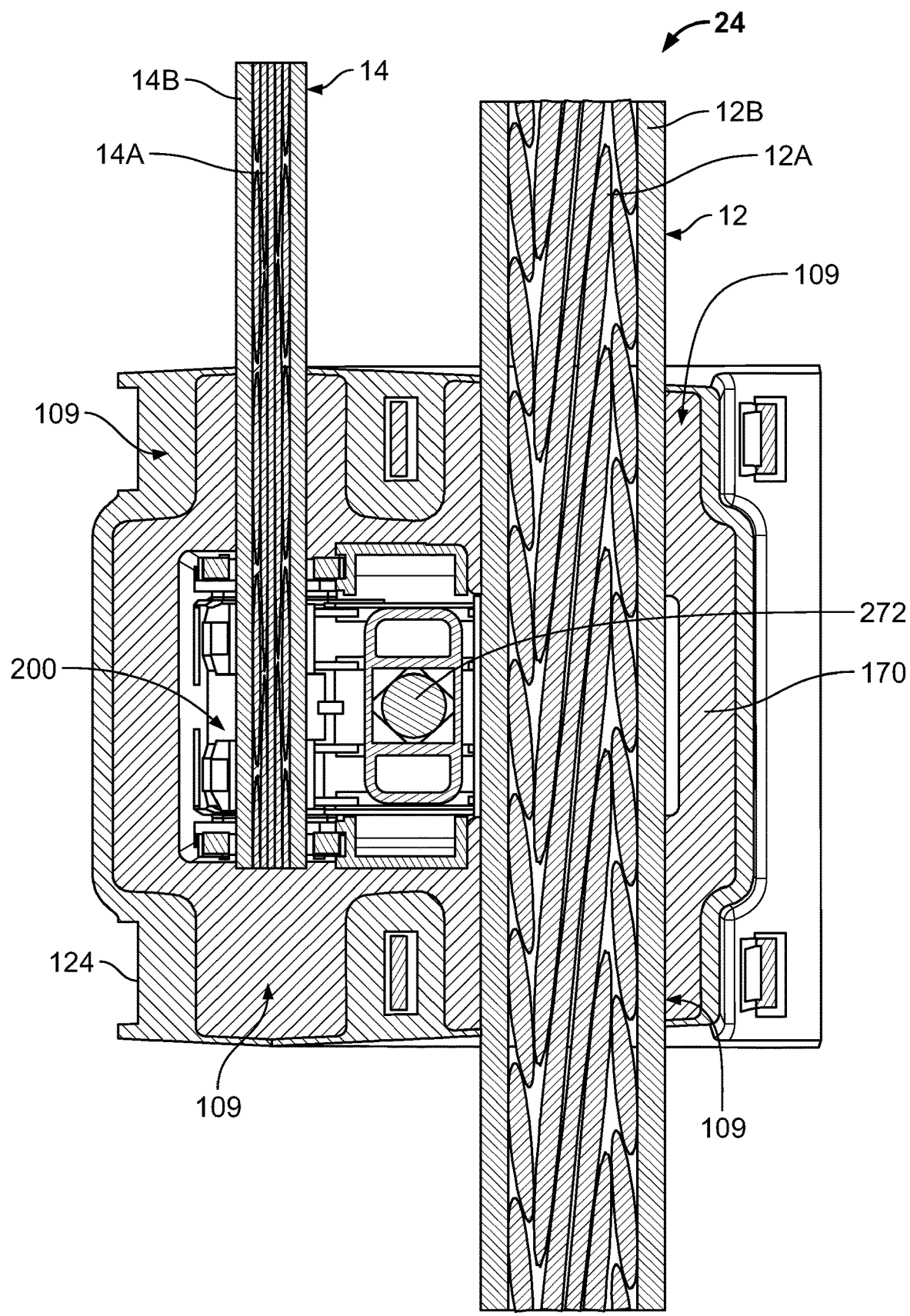
FIG. 6 is a cross-sectional view of the enclosed connection assembly of FIG. 3 taken along the line 6-6 of FIG. 5.
Figure 7:
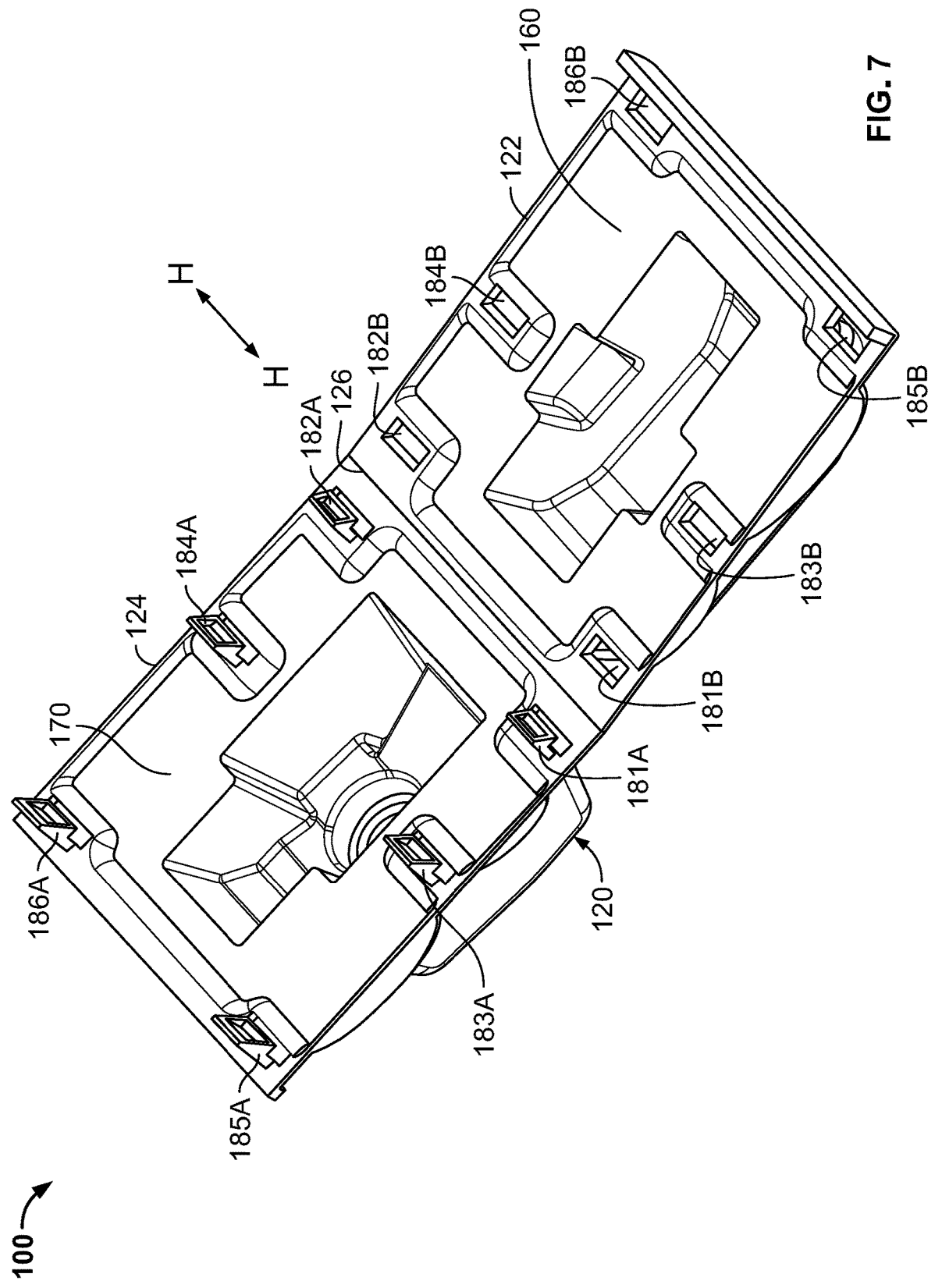
FIG. 7 is a top perspective view of an enclosure assembly forming a part of the connector system of FIG. 1.
Figure 8:
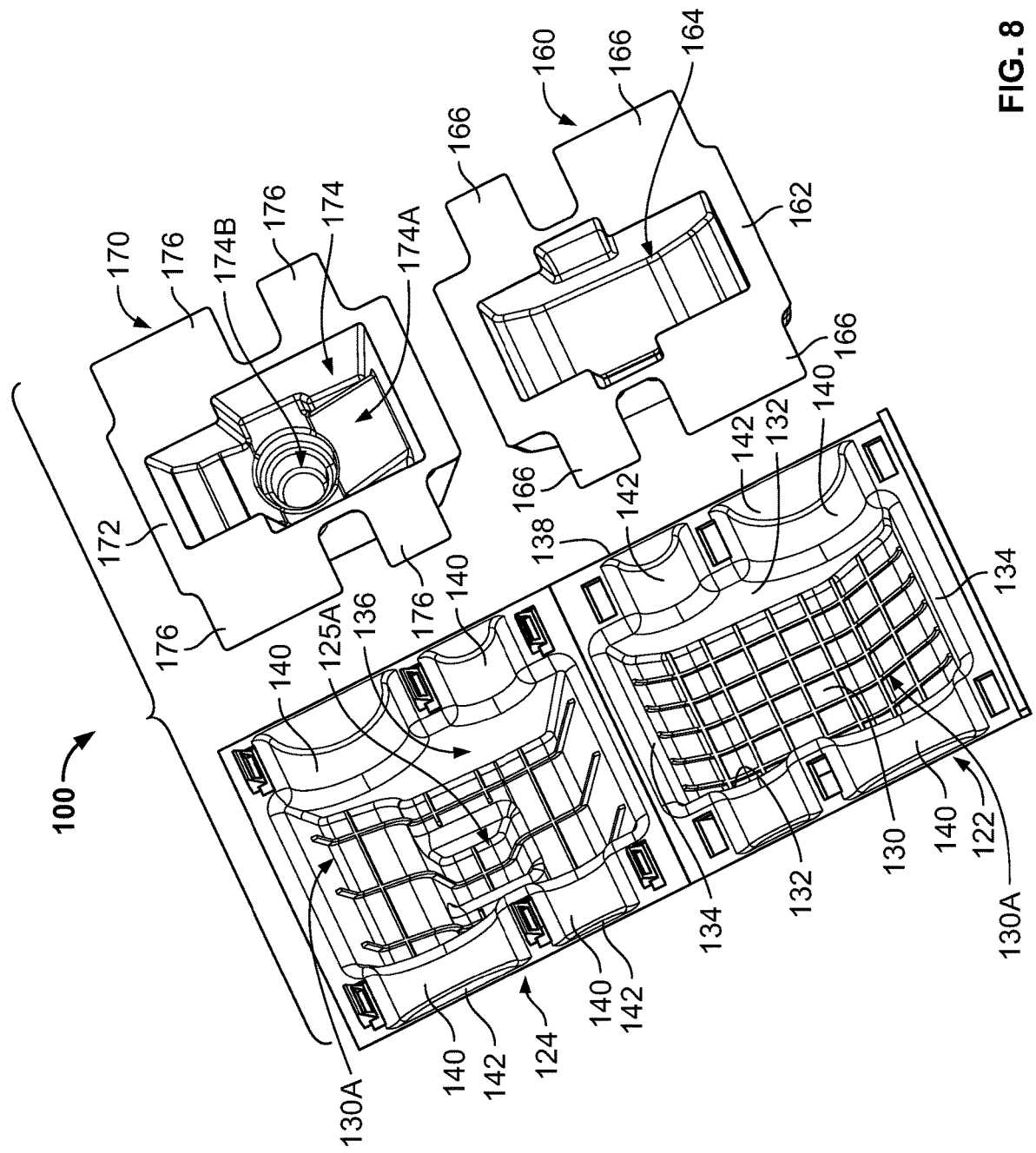
FIG. 8 is an exploded, top perspective view of the enclosure assembly of FIG. 7.
Figure 9:
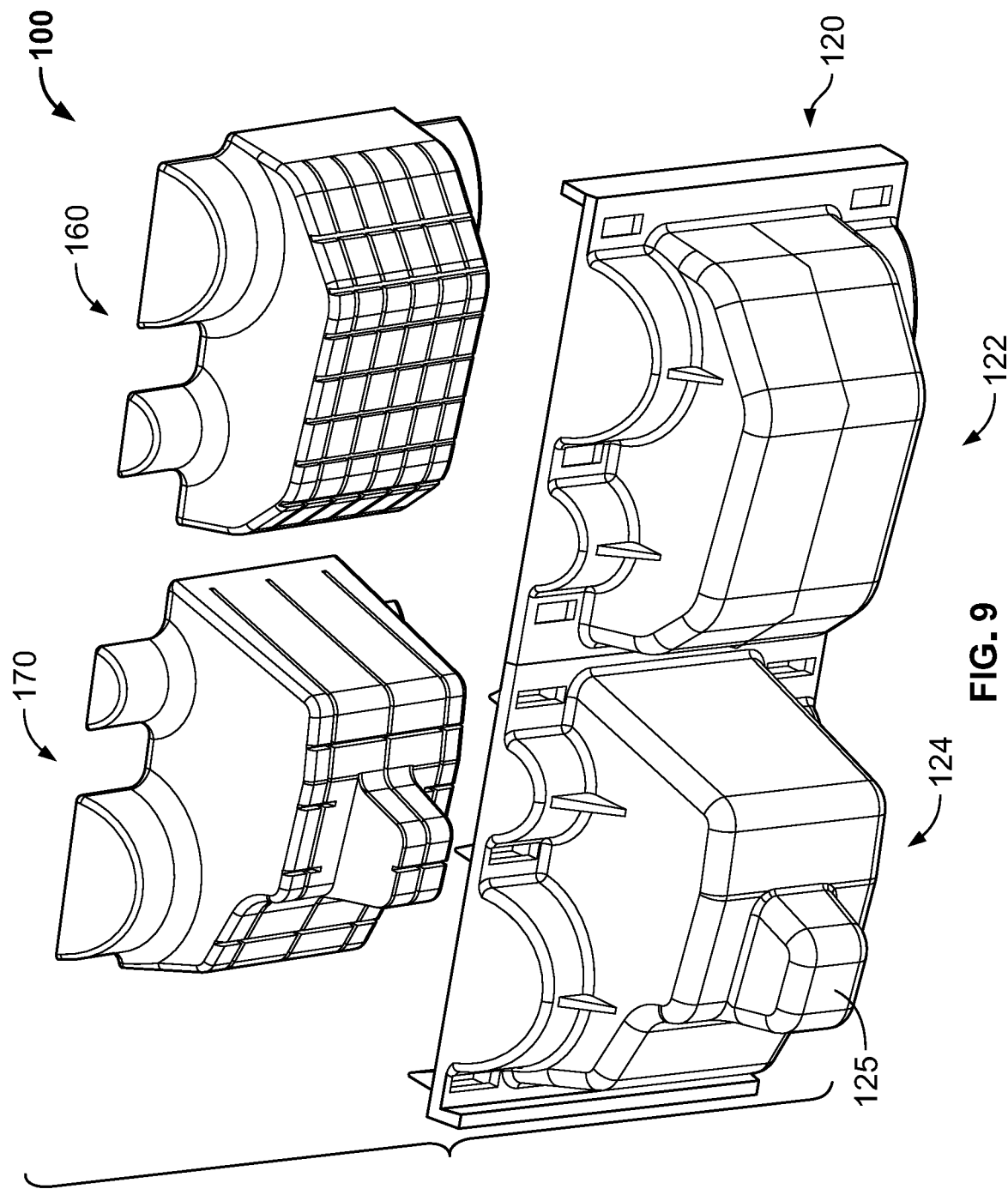
FIG. 9 is an exploded, bottom perspective view of the enclosure assembly of FIG. 7.
Figure 10:
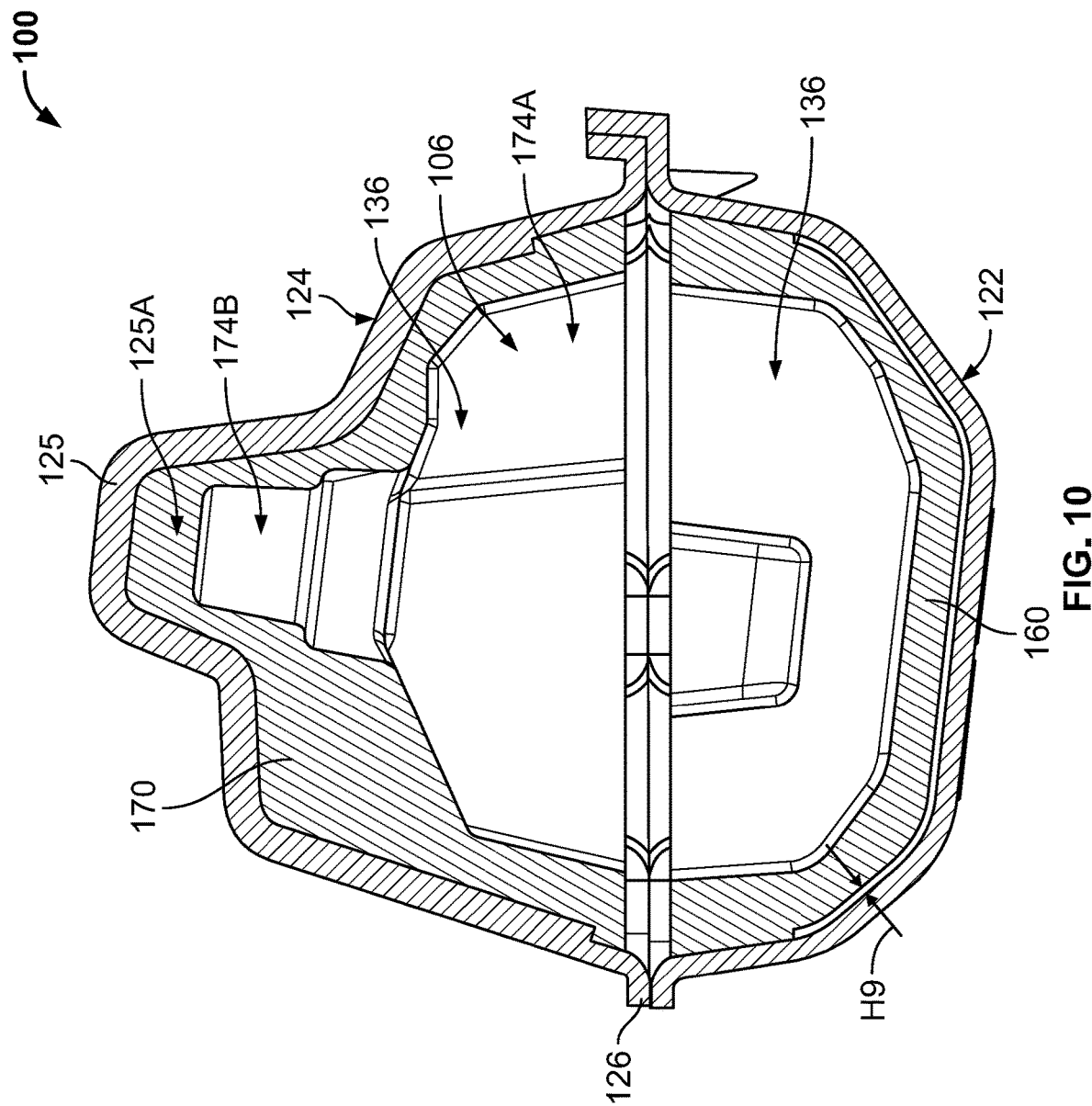
FIG. 10 is a cross-sectional view of the enclosure assembly of FIG. 7 in a closed position.
Figure 11:
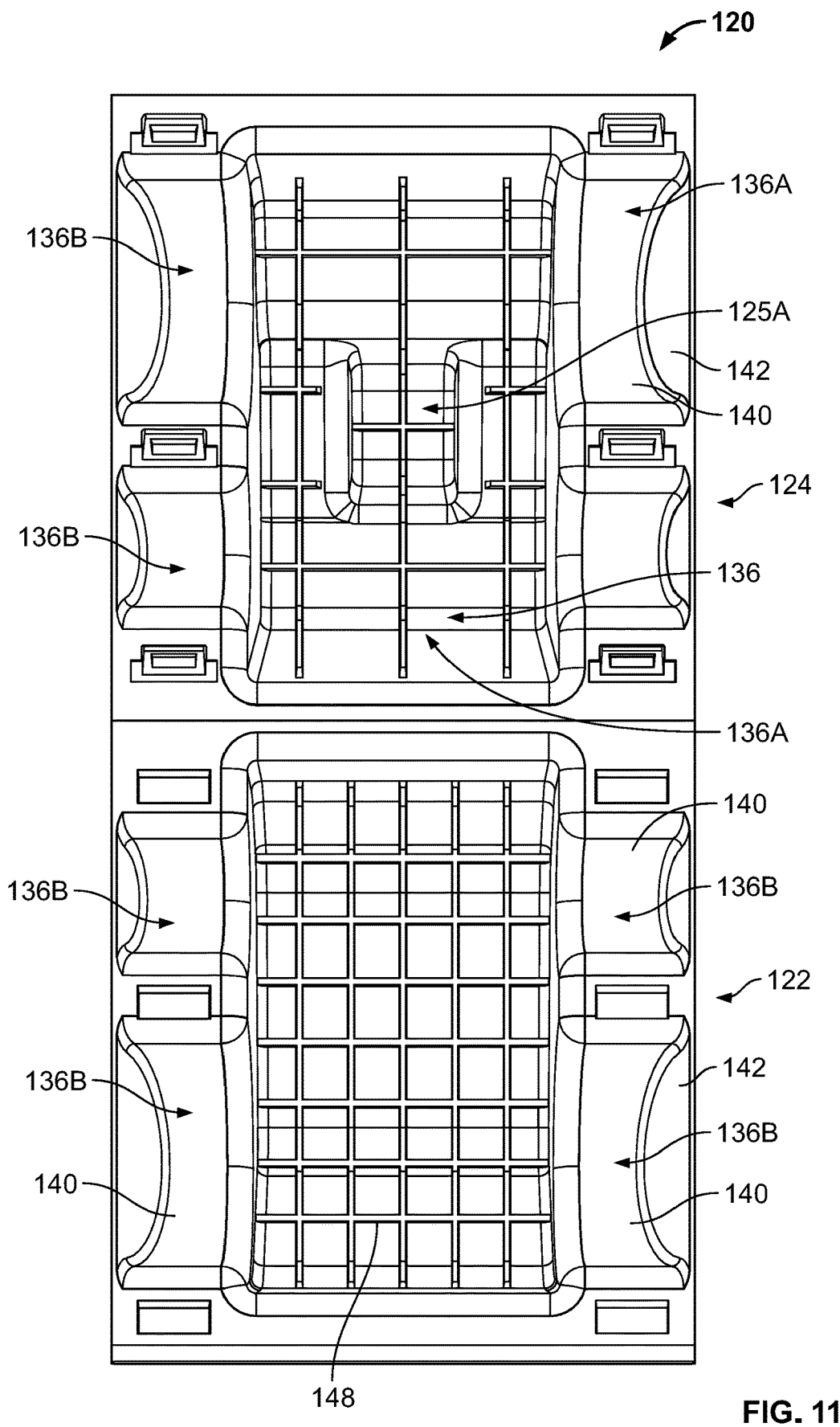
FIG. 11 is a top view of a housing forming a part of the enclosure assembly of FIG. 7.

According to some embodiments, when the enclosure assembly 100 is installed as described herein, the closing of the cover members 122, 124 about the connection 22 forcibly displaces the sealants 160, 170 about the connector 200 such that the sealants 160, 170 flow around the connector 200 and, in some cases, into interstices within the connector 50. According to some embodiments, the sealants 160, 170 substantially fully encapsulate the connector 200 as illustrated in FIGS. 5 and 6. According to other embodiments, the sealants 160, 170 only partially surround the connector 200 (e.g., in the case where the voids 164, 174 extend to the bottom walls 130).

By configuring the voids 164, 174 to have a combined volume less than the volume of the connector 200, the enclosure assembly 100 may ensure that the housing 120 can be closed without requiring undue force, but nonetheless that the sealants 160, 170 are displaced and forced to flow about the connection 22 and also that the sealants 160, 170 sufficiently engage with one another at the interface between the cover members 122, 124.

The side walls 132, the end walls 134 and the port extensions 140 may have slopes that tend to cause each sealant 160, 170 to flow toward the top opening 138A of its respective cover member 122, 124 to promote flow of the sealant about the connection 22 and into engagement with the other sealant 160, 170.

According to some embodiments, the connector system 20 is configured such that at least 75 percent of the sealant 160, 170 is retained in the housing 120 when the housing 120 is closed about the connection 22. According to some embodiments, some of the sealant 160, 170 may be forced out of the enclosure cavity 106 (e.g., through the ports 109 and/or other opening(s)).

As will be appreciated from the description herein, the sealant 160, 170 engages portions of the cables 12, 14 to form seals thereabout. The sealant 160, 170 also forms a sealing block that surrounds the connector 200, thereby sealing the connector 200. Notably, in the illustrated enclosure assembly 100, the sealant masses 160, 170 connect with one another to encapsulate the connector 200 and cables 12, 14.

The enclosure assembly 100 may be sized and configured to accommodate and seal multiple or a range of sizes of connectors 200 and cables 12, 14.

In some embodiments, the cover 120 and the cover assembly 100 can accommodate a range of inclination angles of the axis G-G of the connector 200 when the cover assembly 100 is installed around the connector 200. The inclination angle of the axis G-G may vary depending on the combination of sites of conductors 12, 14 in the connector 200 within its use range.

The cover assembly 100 and the connector 200 are re-enterable and removable for system disconnects, service or maintenance. In some embodiments, the cover assembly 100 and connector 200 are intended to be replaced and not re-used.

The enclosure assembly 100 may provide a number of advantages. The enclosure assembly 100 may provide a reliable seal about the connection 22. This seal may prevent or inhibit the ingress of moisture that would otherwise cause corrosion of the connection 22.

The sealant 160, 170 can seal any of the ports 109 through which no conductor extends (i.e., unused ports). This permits the connector system 20 to accommodate and environmentally seal multiple different configurations, including: main and tap/feed conductors extending through ports on both sides of the cover 120; both main and tap/feed conductors terminated inside the cover 120 (so that two ports remain unoccupied by a conductor); either main or tap/feed conductor terminated in the cover 120 while the other extends through both sides of the cover 120. This capability can eliminate the need for a separate cable end seal, and can offer significant cost savings to each installation.

Moreover, the sealant 160, 170 provides environmental protection for the locations in the insulation layers 12B, 14B pierced by the blade members 252, 254, 256.

The sealant 160, 170, particularly gel sealant, may accommodate conductors of different sizes within a prescribed range. The interfacing sealant masses 160, 170 and the relationship between the connector or connection volume and the sealant volumes (and the void 164, 174 volumes, if provided) may ensure that a suitable seal is provided by and between the sealant masses for a broadened range of sizes connections 22 positioned in the enclosure assembly 100.

The ribs 148 increase the strength and structural rigidity of the bottom walls 130 to resist mechanical impacts. The ribs 148 also provide additional "tooth" surfaces to promote adhesion between the sealant 160, 170 (e.g., gel sealant) and the cover members 122, 124.

When the sealant 160, 170 is a gel, the cables 12, 14 and the housing 120 may apply a compressive force to the sealant 160, 170 as the assembly 100 is transitioned from the open position to the closed position. The gel may thereby be elongated and be generally deformed and substantially conform to the outer surfaces of the connector 50, the cables 12, 14 and to the inner surface of the housing 120. Some shearing of the gel may occur as well. At least some of the gel deformation may be elastic. The restoring force in the gel resulting from this elastic deformation generally causes the gel to operate as a spring exerting an outward force between the housing 120 and the connector 200 and the cables 12, 14. The compressive loading and restoring force are maintained by the closure of the cover members 122, 124.

Various properties of the gel as described above may ensure that the gel sealant 160, 170 maintains a reliable and long lasting seal between the housing 120 and the connector 50 and the cables 12, 14. The elastic memory of and the retained or restoring force in the elongated, elastically deformed gel generally cause the gel to bear against the mating surfaces of the connector 200, the cables 12, 14 and the interior surface of the housing 120. Also, the tack of the gel may provide adhesion between the gel and these surfaces. The gel, even though it is cold-applied, is generally able to flow about the connector 50, the cables 12, 14 and the housing 120 to accommodate their irregular geometries.

According to some embodiments, the sealant 160, 170 is a self-healing or self-amalgamating gel. This characteristic, combined with the aforementioned compressive force between the connector 200, cables 12, 14 and the housing 120, may allow the sealant 160, 170 to re-form into a continuous body if the gel is sheared by the insertion of the cables 12, 14 into the enclosure assembly 100. The gel may also re-form if the connector 200 and cables 12, 14 are withdrawn from the gel.

The sealant 160, 170, particularly when formed of a gel as described herein, may provide a reliable moisture barrier for the cables 12, 14 and the connector 200, even when the enclosure assembly 100 is subjected to extreme temperatures and temperature changes. The housing 120 may be made from an abrasion resistant material that resists being punctured by the abrasive forces.

The gel sealant may also serve to prevent or inhibit corrosion of the connection 22 by depositing a layer of oil from the gel on the exposed surfaces of the connector 200 and conductor portions 12A, 14A in the enclosure cavity 106. Even if the gel is removed from the connection 22, the oil may remain to coat the connection surfaces as a barrier to moisture.

As will be appreciated from the description herein, enclosure assemblies according to the present invention may be provided as pre-formed and fully assembled units, with pre-cured gel or other sealant therein as described above, that may be cold applied about a connection to form a seal.

In some embodiments, the void forming inserts 8, 9 are removed after the voids 164, 174 are formed, and the cover assembly 100 is then packaged for delivery to the end user.

In other embodiments, the void forming inserts 8, 9 are left in place in the sealant masses 160, 170 after the voids 164, 174 are formed. The inserts 8, 9 are then removed by the end user prior to final installation. In this case, the inserts 8, 9 can help maintain the shapes of the voids 164, 170 and protect the sealants 160, 170 from contamination during shipping and handling. The inserts 8, 9 can eliminate the need for a secondary operation or component to serve these purposes.

While, in accordance with some embodiments, the housing 120 is integrally and unitarily formed, the housing may be otherwise formed in accordance with some aspects of invention. For example, the cover members 122, 124 and/or the hinge 126 may be separate parts joined together in hinged fashion or otherwise. For example, the cover members 122, 124 may be separate pieces secured together by tie wraps, snaps, latches or the like and/or not hinged.

According to some embodiments, the voids 164, 174 are substantially centered with respect to the cavities 136. According to some embodiments, the voids may instead be offset.

According to some embodiments, the voids 164, 174 extend all the way to the bottom walls 130.

According to some embodiments, an enclosure assembly 100 as described herein may be formed without the sealant voids 164, 174 (i.e., the cover members 122, 124 are solid filled up to a desired level). In this case, portions of the sealants 160, 170 may be forced out of the enclosure cavity 106 (e.g., through the ports 109 and/or other openings). This modified enclosure assembly can be formed in the same manner as described above for the enclosure assembly 100 except that the aforementioned spacer inserts are omitted.

According to some embodiments, a housing as disclosed herein (e.g., the housing 120) may be used to enclose a connection including an IPC connector (e.g., the connection 22) without the provision of sealant (e.g., the sealants 160, 170) therein. Such a sealant-free housing may provide touch protection.

According to some embodiments, the enclosure assembly 100 and the connector 200 are pre-configured or packaged as a matched kit. However, the enclosure assembly 100 and the connector 200 need not be provided as a kit. For example, the enclosure assembly 100 may be retrofitted onto a connector 200 that has been previously installed, even years prior.

Connectors according to embodiments of the invention may employ more or fewer clamping mechanisms than shown for the exemplary embodiments. According to some embodiments, other types of clamping mechanisms may be employed.

The methods and connector assemblies in accordance with embodiments of the present invention may provide the advantages of relatively slow displacement tools (including battery-powered tools). As compared to at least some explosive actuated tools, the present methods and connector assemblies may provide improvements in simplicity, safety, speed, reduction in training requirements, environmental impact, ergonomics, and cost savings. Hand and battery operated tools may also be employed in countries, environments and applications where use of explosives is limited.

According to some embodiments, the cables 12, 14 are power transmission conductors. According to some embodiments, the cables 12, 14 are aerial power transmission conductors. According to some embodiments, the cable 12 is a main line electrical conductor cable and the cable 14 is a tap line electrical conductor cable.

Figure 17:
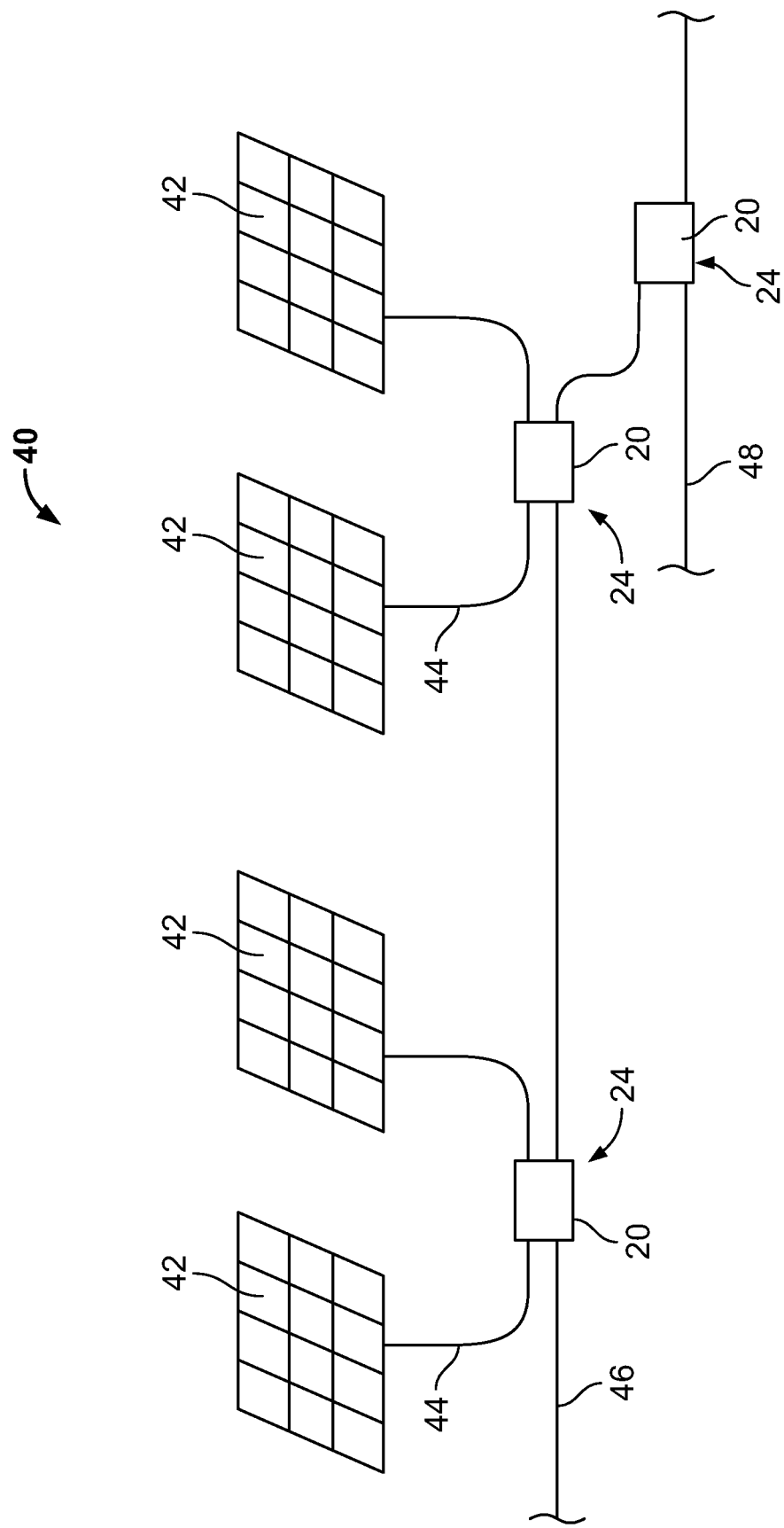
FIG. 17 is a solar electrical power generation collection system including a plurality of the connector systems of FIG. 1.

In some embodiments, connector systems 20 as disclosed herein are used in a solar electrical power generation collection system 40 (FIG. 17). The connector systems 20 are used to electrically connect a plurality of distributed solar electrical generation devices 42 to a central collection point. Each solar device 42 may include an array of solar energy cells (a solar array). In some embodiments, the solar energy cells are photovoltaic cells. Each solar array 42 may take the form of a panel (solar panel).

Each solar array (e.g., photovoltaic panel) includes a feed cable 44. One end of the feed cable 44 may be connected to a first one of the solar arrays 42 while the other end of the feed cable 44 is connected to a second one of the solar arrays 42. A main cable 46 (which may be referred to as a collector or trunk cable) is connected to the central collection point (e.g., a combiner box) directly or through a further conductor (e.g., a main trunk cable 48). The main cable 46 is electrically connected to the feed cable 44 by the connector 200 so that current from the two solar arrays 42 is directed into the main cable 46. The connector 200 is housed in a cover assembly 100 to form a protected connection assembly 24 as described herein.

Alternatively, each solar array 42 may have an individual feed cable 44 that is received into the cover assembly 100 through a respective one of the ports 109 and terminated at the connector 200.

The solar electrical power generation collection system 40 may include a plurality of the connections 24. The main cable 46 may be connected to one or more feed cables 44 in each connection 24.

According to some embodiments, the protected connection assembly 24 is compliant with Underwriters Laboratory Standard UL6703 (Edition date 2011 Aug. 2). According to some embodiments, the protected connection assembly 24 can be buried directly underground (without provision of an additional enclosure) in compliance with Underwriters Laboratory Standard UL486D (Edition date 2015 Jun. 19).

According to some embodiments, the conductors 12, 14 have a diameter of from about 0.222 to 1 inch.

In some embodiments, one or more of the slots 181B-186B and the slots at the bases of the prongs 181A-186A can receive cable ties, which can be used to secure the cover assembly 100 in the closed position. Additionally, other cable tie slots may be formed in the cover 120 to receive cable ties.

With reference to FIGS. 20-27, a sealant-filled enclosure assembly 300 according to further embodiments of the present invention is shown therein. The enclosure assembly 300 may be used in place of the enclosure assembly 100 and with the connector 200 (not visible in FIGS. 20-27) to form a connector system 20'. The connector system 20' may be used to form an enclosed and protected connection assembly 24' in the same manner as described above for forming the connection assembly 24 using the connector system 20, except as discussed below. The protected connection assembly 24' can be used in an electrical power transmission such as the system 40 (FIG. 17), for example.

Figure 20:
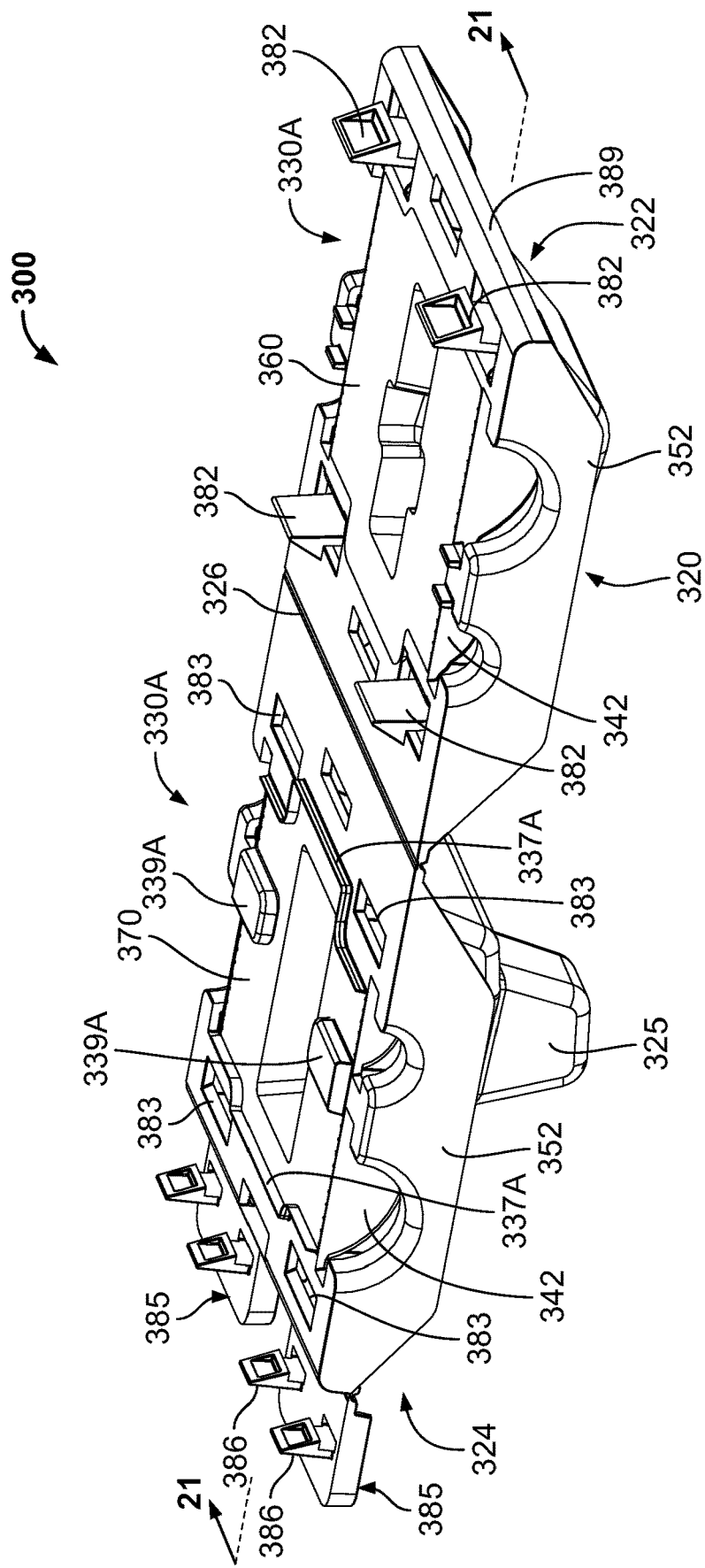
FIG. 20 is a top perspective view of an enclosure assembly according to further embodiments in an open position.
Figure 25:
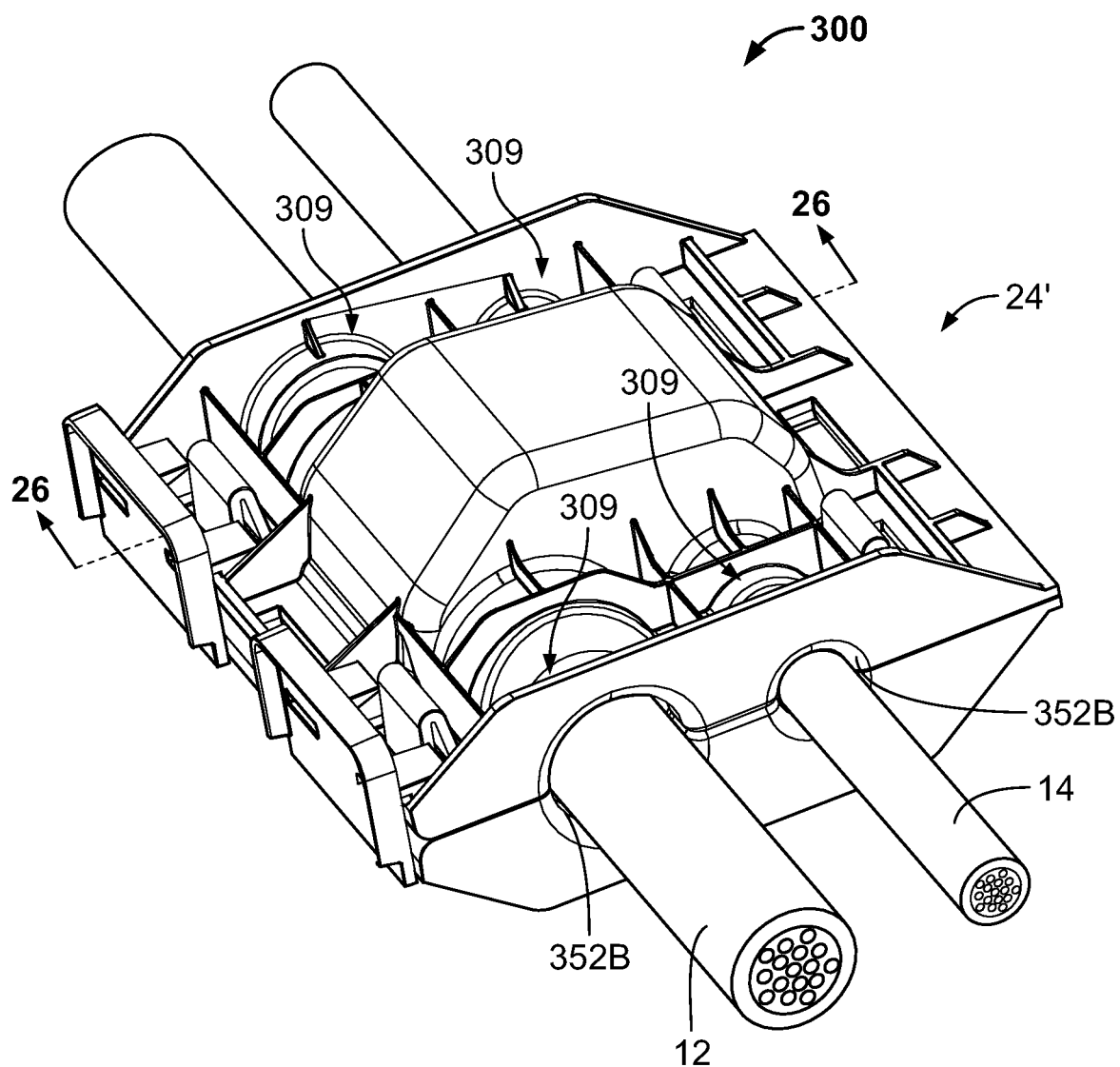
FIG. 25 is a top perspective view of an enclosed connection including the enclosure assembly of FIG. 20 in a closed position.

The sealant-filled enclosure 300 includes a housing 320 and masses of sealant 360, 370 disposed therein. According to some embodiments, and as discussed above with regard to the sealant 160, 170, the sealant 360, 370 may be a gel. The housing 320 includes a first shell or cover member 322 and a second shell or cover member 324 joined to one another by a hinge 326 and adapted to move between an open position as shown in FIG. 20 and a closed position as shown in FIG. 25. In the open position, the enclosure assembly 300 can receive the connection 22 (FIG. 1) and adjacent portions of the cables 12, 14. In the closed position, the enclosure assembly 300, including the masses of sealant 360, 370, may operate to seal about and protect the connection 22. In the closed position, the enclosure assembly 100 defines an enclosure cavity corresponding to the enclosure cavity 106 (FIG. 10) and opposed pairs of ports 309 (FIGS. 25 and 26) communicating with the enclosure cavity 306. The shape or geometry of the enclosure cavity resembles or substantially conforms that of the connector 200.

Each cover member 322, 324 includes a bottom wall 330. Opposed side walls 332 and opposed end walls 334 extend upwardly from the bottom wall 330. Opposed pairs of port extensions 340 extend longitudinally from either end of each cover member 322, 324. Each port extension 340 is terminated by a port wall 342. The port walls 342 may be constructed as described above for the port walls 142.

The upper edges of the walls 332, 334 form a perimeter edge 338 defining an opening. The walls 330, 332, 334 and the port extensions 340 of each cover member 322, 324 define an overall cover member chamber or cavity and a front opening 330A communicating with the cavity. The cover member cavity includes a main cavity portion 336A and conductor port subchannels 336B defined within each port extension 340.

The cover member 324 further includes a dome 325 defined in its bottom wall 330. The dome 325 defines an extension cavity 325A. The extension cavity 325A is contiguous with and communicates with the main cavity 336A of the cover member 324.

The cover members 322, 324 are pivotably joined by the hinge 326. According to some embodiments, the hinge 326 is a flexible, living hinge.

Figure 26:
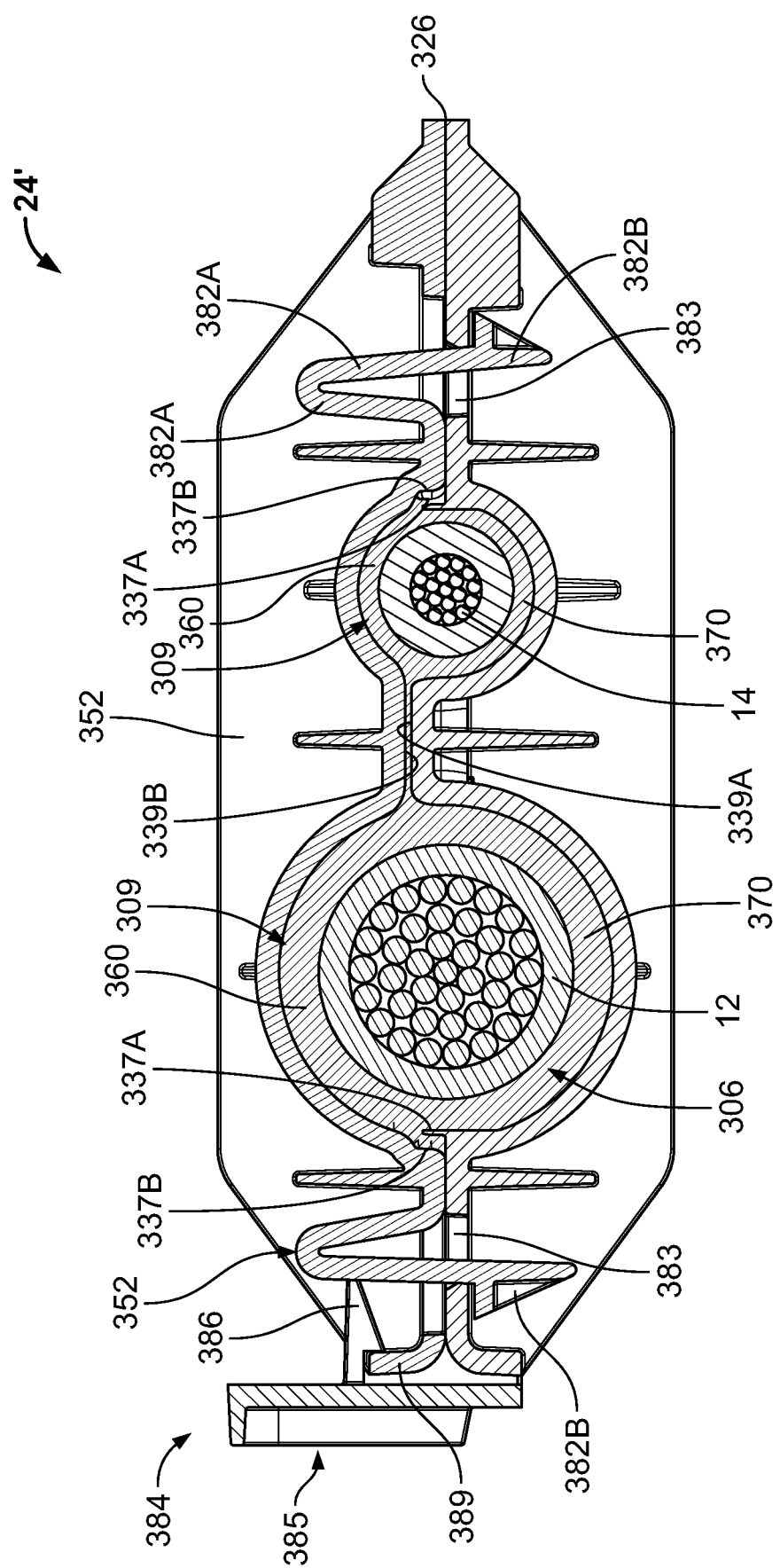
FIG. 26 is a cross-sectional view of the enclosure connection of FIG. 25 taken along the line 26-26 of FIG. 25.

The housing 320 includes a latch system including four integral latch mechanisms. Each latch mechanism includes a latch finger 382 on and projecting inwardly from the cover member 324. Each latch mechanism further includes a latch slot or opening 383 in the cover member 322. The latch fingers 382 may be integrally formed with the cover member 324. The latch fingers 382 and openings 383 can be selectively engaged, whereupon they cooperate to releasably secure the cover members 322, 324 in a closed configuration as shown in FIGS. 25-27. Each latch finger 382 has elastically deflectable legs 382A (FIG. 26) and an integral interlock section or barb 382B. The barb 382B is configured to enter through the associated opening 383 and interlock with the cover member 324 as shown in FIGS. 25-27.

The housing 320 further includes a safety latch mechanism 384. The safety latch mechanism 384 includes two side-by-side safety latch members 385 located on the end of the cover member 324 opposite the hinge 326. Each latch member 385 is pivotably connected to the cover member 324 by a hinge 385A (e.g., a living hinge). The safety latch mechanism 384 also includes an interlock feature in the form of a widthwise extending latch flange 389.

Each latch member 385 includes a body 385B and a pair of latch fingers 386. Each latch finger 386 is connected to the body 385B by a base 388. In some embodiments, each base 388 is configured such that the latch finger 386 is substantially rigid and nondeflectable relative to the body 385B.

Each latch finger 386 further includes an integral interlock section or barb 387. Each barb 387 has a tapered or ramped cam surface 387A (FIG. 27).

Each cover member 322, 324 includes a pair of opposed strain relief features or frame portions 350 extending longitudinally and laterally outboard from the port walls 342 on either side. The frame portions 350 collectively form a cable strain relief system 351.

Each frame portion 350 includes a longitudinally extending strain relief wall 352 and a central leg 354 and outer legs 354D connecting the wall 352 to the adjacent side wall 332. The walls 352 are rigidly affixed to the side walls 332 by the legs 354, 354D.

Each wall 352 includes a pair of strain relief channels or slots 352A defined therein. When the cover members 322, 324 are closed (as shown in FIG. 25), the pairs of opposing slots 352A combine to form strain relief openings 352B. Each strain relief opening 352B is aligned with a respective one of the ports 309.

In some embodiments, the distance D15 (FIG. 23) from each frangible port wall 342 to the outer end of the adjacent strain relief opening 352B is in the range of from about 0.5 inch to 0.875 inch.

Each wall 352 is spaced away from the adjacent side wall 332 so that voids or openings 354B are defined between each port wall 342 and its adjacent slot 352A. Likewise, the openings 354B separate each port 309 from its associated strain relief opening 352B. In some embodiments, each wall 352 is spaced away from the adjacent port wall 342 a standoff distance D14 (FIG. 23) in the range of from about 0.2 inch to 0.4 inch.

The legs 354 of the cover member 322 each include a pair of upstanding tabs defining a slot 354A therebetween. Each slot 354A is configured and positioned to receive the opposing leg 354 of the cover member 324 when the cover 320 is closed.

Prior to use, the sealant 360 is contained in the cavity 336 of the cover member 322 such that a main sealant portion of the sealant 360 is disposed in the main cavity 336A and port sealant portions of the sealant 360 are disposed in the port subchannels 336B.

Figure 21:
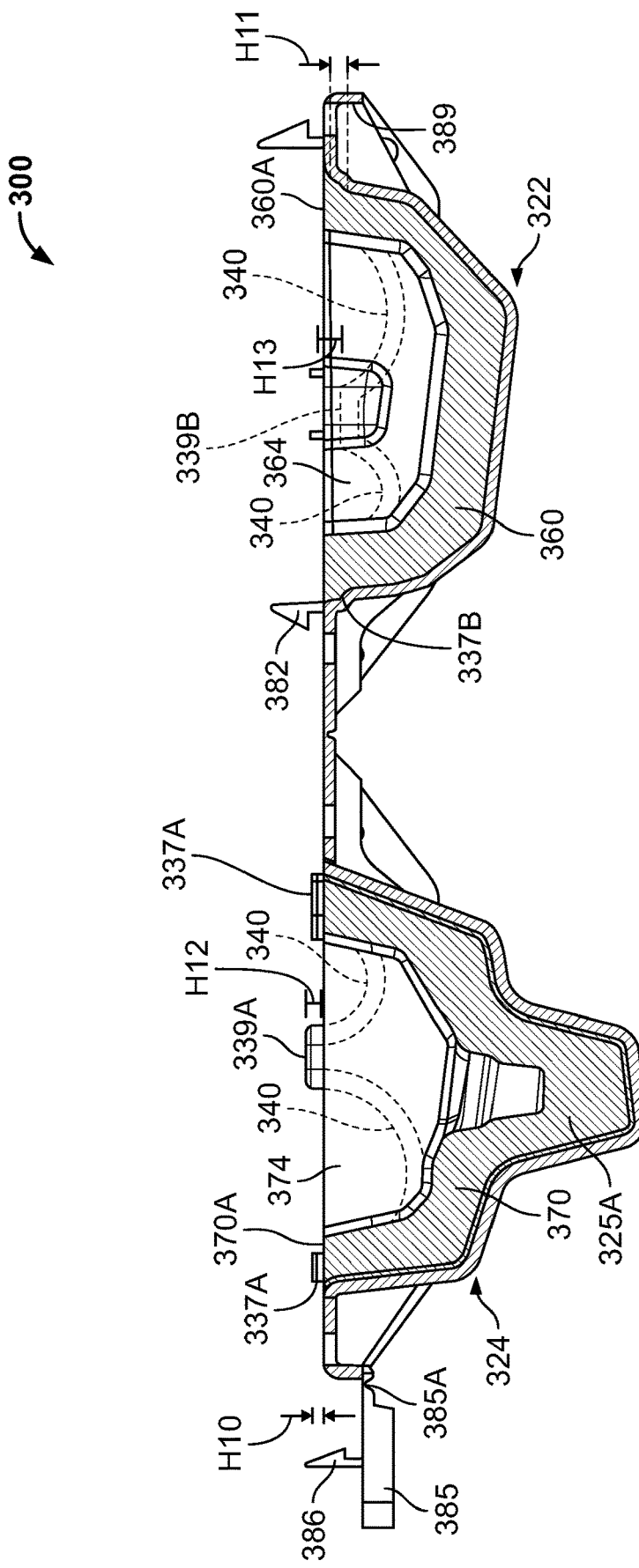
FIG. 21 is a cross-sectional view of the enclosure assembly of FIG. 20 taken along the line 21-21 of FIG. 20.

According to some embodiments, a void 364 (FIG. 21) is pre-formed or defined in the sealant 360. According to some embodiments, the void 364 is open to the opening 330A. According to some embodiments, the sealant 360 fully surrounds the remainder of the void 364 so that the void 364 is spaced apart from cover member 322 (by the sealant 360) on all sides except the top side. According to some embodiments, the sealant 360 fills the cover member cavity 336 (not including the volume of the void 364) to a level near but not fully to the perimeter edge 338. In other embodiments and as shown in FIGS. 20 and 21, the sealant 360 fills the cover member cavity 336 of the cover member 322 substantially fully up to the perimeter edge 338.

Prior to use, the sealant 370 may be contained in the cavity 336 of the cover member 324 such that a main sealant portion of the sealant 370 is disposed in the main cavity 336 and port sealant portions are disposed in the port subchannels 336B.

According to some embodiments, a void 374 is preformed or defined in the sealant 370. According to some embodiments, the void 374 is open to the opening 330A. According to some embodiments, the sealant 370 fully surrounds the remainder of the void 374 so that the void 374 is spaced apart from cover member 324 on all sides except the top side. According to some embodiments, the sealant 370 fills the cavity 336 of the cover member 124 to a level near but not fully to the perimeter edge 138. In other embodiments and as shown in FIGS. 20 and 21, the sealant 370 fills the cover member cavity 336 (not including the volume of the void 374) substantially fully up to the perimeter edge 338.

According to some embodiments, the voids 364, 374 are shaped to conform to respective lower and upper halves of the connector 200, as discussed above with regard to the voids 164, 174.

The cover member 324 further includes two opposed, integral, upstanding sealant retention flanges 337A. Each flange 337A is positioned along an end edge of the perimeter 338 (i.e., at the edge of the opening 330A) and extends across the width of the cover member 324. As shown in FIG. 21, each flange 337A projects a height H10 above the top surface 370A of the sealant 370.

The cover member 322 further includes two opposed, integral, recessed sealant retention troughs or grooves 337B. Each groove 337B is positioned along an end edge of the perimeter 338 (i.e., at the edge of the opening 330A) and extends across the width of the cover member 322. As shown in FIG. 21, each groove 337B is recessed a depth H11 below the top surface 360A of the sealant 360.

The cover member 324 further includes two opposed, integral, raised lands 339A. Each land 339A is positioned between the port extensions 340 on a side of the cover member 324. As shown in FIG. 21, each land 339A projects a height H12 (FIG. 21) above the top surface 370A of the sealant 370.

Figure 22:
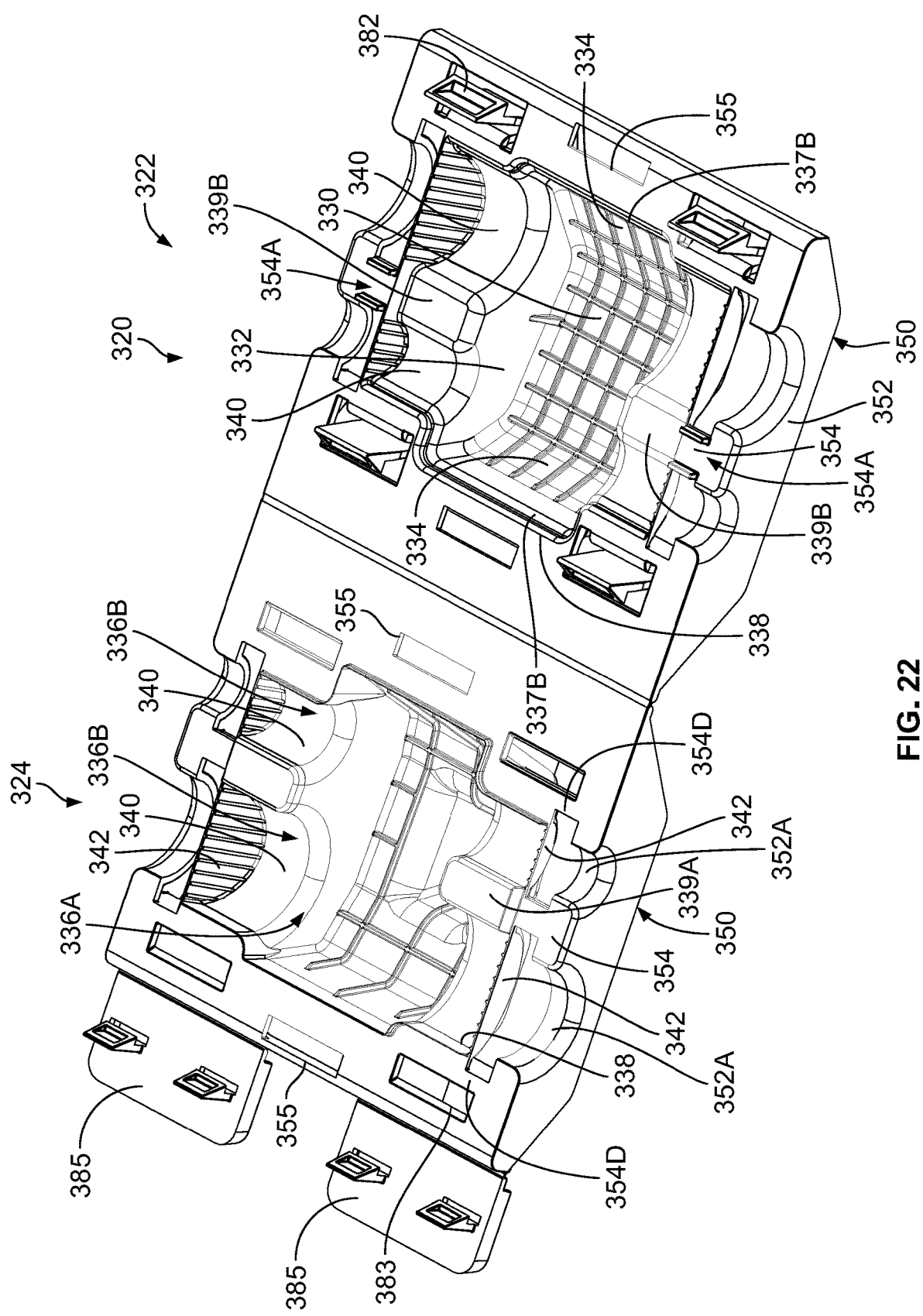
FIG. 22 is a top perspective view of a housing forming a part of the enclosure assembly of FIG. 20.
Figure 23:
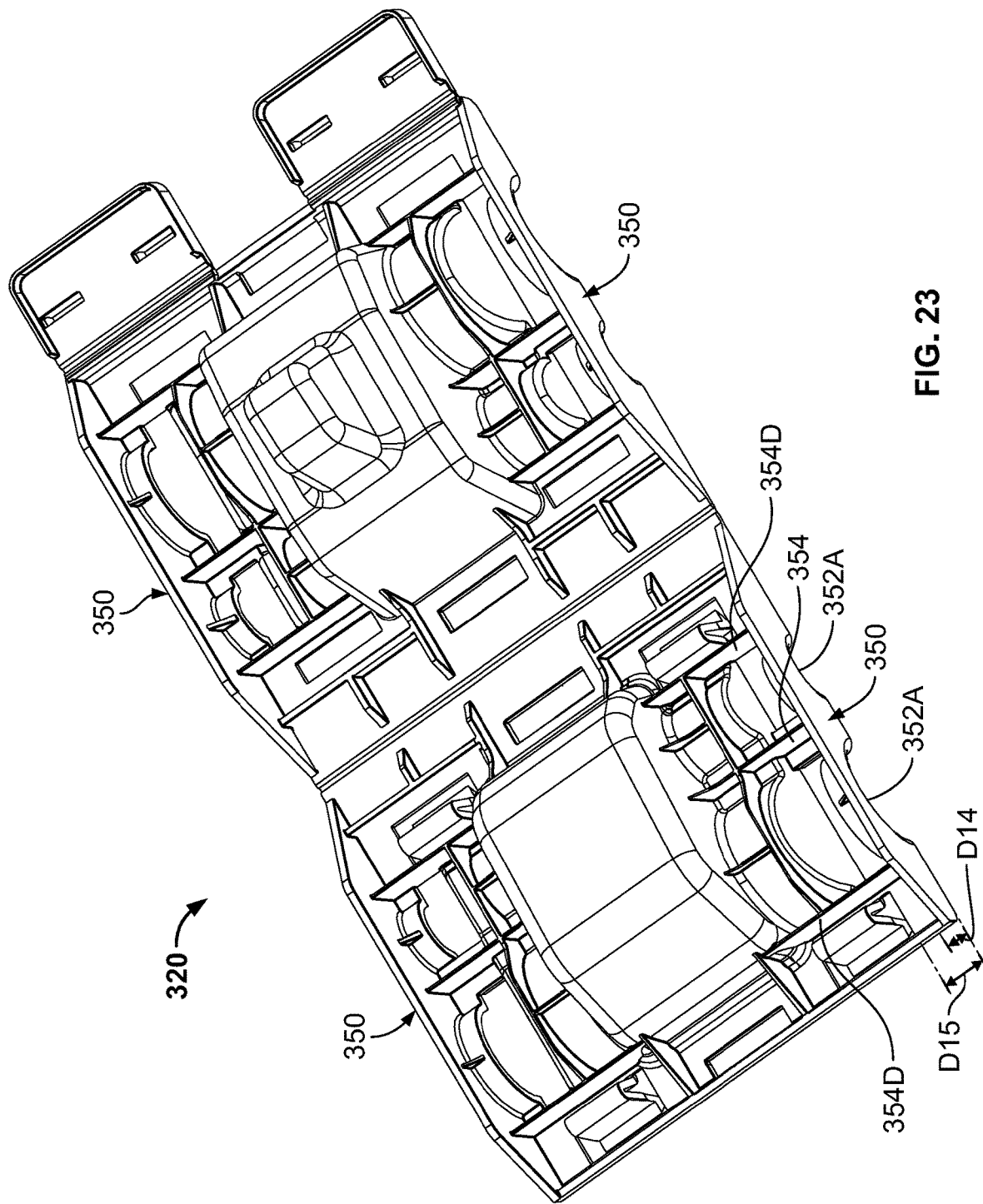
FIG. 23 is a bottom perspective view of the housing of FIG. 22.

The cover member 322 further includes two opposed, integral, recessed lands 339B. Each land 339B is positioned between the port extensions 340 on a side of the cover member 322. As shown in FIGS. 21 and 22, each land 339B is recessed a depth H13 (FIG. 21) below the top surface 360A of the sealant 360.

The enclosure assembly 300 may be formed as described above for the enclosure assembly 100. The cover members 322, 324 and the hinges 326, 385A may be integrally formed. According to some embodiments, the cover members 322, 324 and the hinges 326, 385A are unitarily molded. According to some embodiments, the entirety of the housing 320 is unitarily molded. The housing 320 may be injection molded or vacuum formed, for example. According to some embodiments, the cover members 322, 324 and the hinges 326, 385A are monolithic.

The sealants 360, 370 may be installed in the cover members 122, 124 and the voids may be formed, as s described above for the enclosure assembly 100.

The enclosure assembly 300 may be formed using the same material as described above for the enclosure assembly 100.

The connector system 20' can be used as follows in accordance with methods of the present invention to form the enclosed connection 24'. Generally, the connection 22 is first formed by installing the connector 200 on the cables 12, 14 as described above. Thereafter, the enclosure assembly 300 is installed over the connection 22 and portions of the cables 12, 14.

Figure 24:
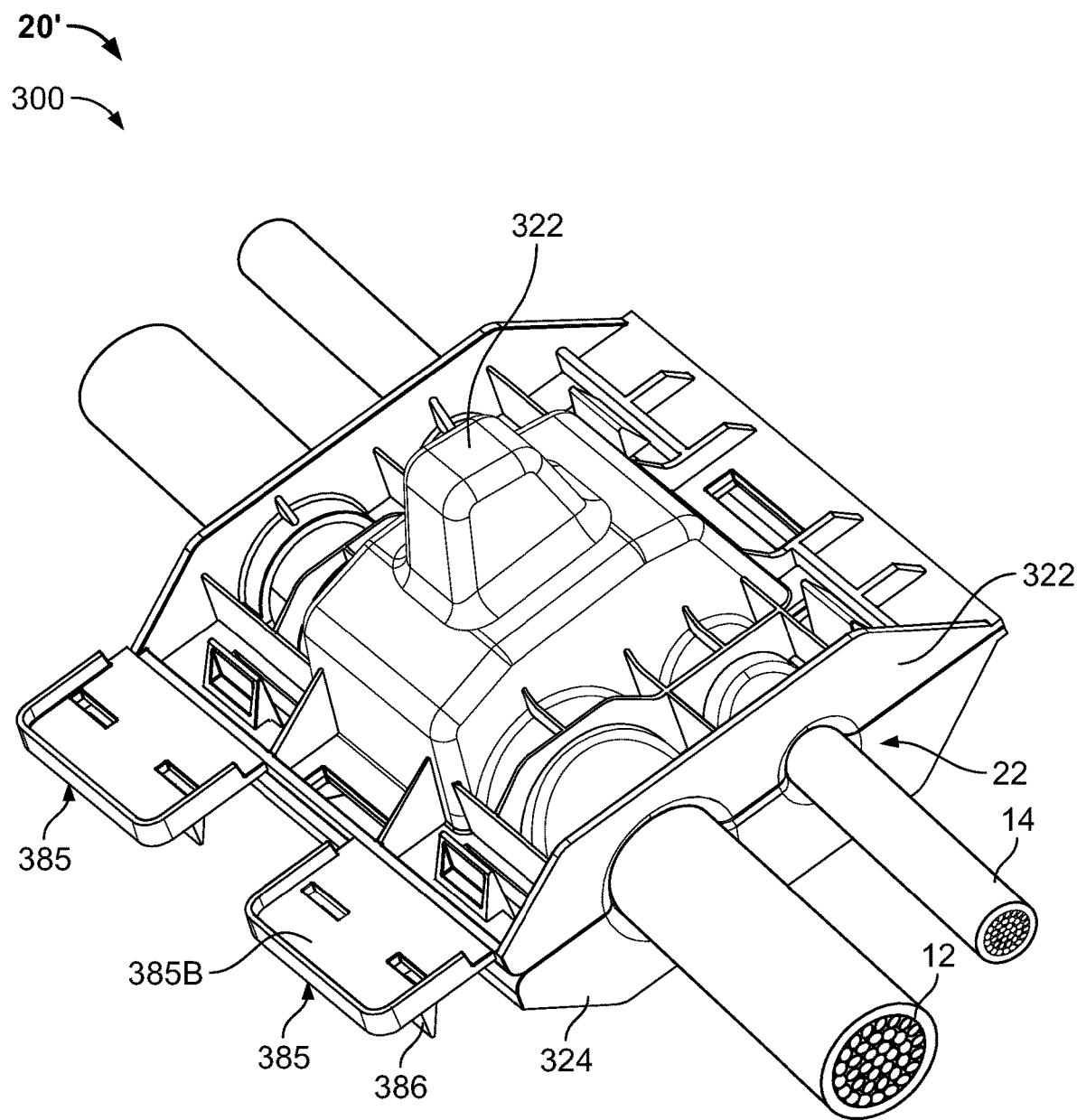
FIG. 24 is a top perspective view of the enclosure assembly of FIG. 20 partially installed on a connection.

In order to install the enclosure assembly 300 on the connection 22 and the cables 12, 14, the enclosure assembly 300 may be held in a fully or partially open position as shown in FIG. 20. The safety latch members 385 are in an open or ready position. The connection 22 is then inserted between the cover members 322, 324. The enclosure assembly 300 is then closed by urging one or both of the cover members 322, 324 to relatively pivot about the hinge 326 into engagement as shown in FIG. 24, such that the latch fingers 382 and latch openings 383 are made to interlock in the closed position.

With cover members 322, 324 fully closed or nearly fully closed, the safety latch members 385 are pivoted in a direction FP (FIG. 27) about the hinges 385A until the barbs 387 of their latch fingers 386 interlock with the latch flange 389, as shown in FIGS. 25 and 26. Each safety latch member 385 is thereby placed in its safety latching position. The interlocks between the latch features 382, 383 are thereby reinforced by the safety latch members 385. The main latch features 382, 383 proximate the free ends of the cover members 322, 324 and the safety latch mechanism provide a double interlock securement.

In some instances, the latch members 385 may be folded direction FP as described while the cover members 322, 324 are not fully mated and closed and, in some cases, when the latch fingers 382 are not fully interlocked with their latch openings 383. In this case, the force applied to the latch members 385 serves to force or pinch the cover members 322, 324 together toward closure. More particularly, the ramped surfaces 387A of the barbs 387 operate as a cam surface that applies compressive loading in opposed directions FC (FIG. 27). The ramped surfaces 387A convert the longitudinally inwardly directed force applied by the installer to the latch member 385 into a transversely directed closure force.

When the cover 320 is closed, the engagements between the slots 354A of the cover member 322 and the legs 354 of the cover member 324 reinforce the rigidity of the cover 320. The interaction between these features may also facilitate and maintain proper alignment between the cover members 322, 324 as they are transitioning into the closed position.

The closed housing 320 defines an enclosure cavity 306 including a main enclosure cavity 307 and contiguous port channels 309 (collectively defined by the port extensions 340). The connector 200 is received in the voids 364, 374 of the sealants 360, 370. The connection 22 is encapsulated within the sealant 360, 370, and the sealant 360, 370 and the connection 22 are in turn encapsulated within the housing 320. The portions of the cables 12, 14 within the connection 22 and extending from the connection 22 and through the port channels 309 to the frangible walls 342 are likewise encapsulated in the sealant 360, 370.

The environmental seal is further enhanced by the sealant retention flanges 337A and the sealant retention grooves 337B. As the cover 320 is closed, the flanges 337A will travel into the grooves 337B and embed in the sealant 360 contained therein, as shown in FIG. 26. The features 337A, 337B thereby serve to better contain the sealants 360, 370 and form a seal at the interface between the cavities of the cover members 322, 324.

The environmental seal is also further enhanced by the lands 339A, 339B. As the cover 320 is closed, the raised lands 339A will travel into the recesses over the recessed lands 339B and embed in the sealant 360 contained therein, as shown in FIG. 26.

The strain relief system 350 provides strain relief for the cables 12, 14 where they exit the enclosure 300. In some embodiments, the openings 352B are sized with a diameter slightly larger (e.g., from about 0 to 0.1 inch larger) than the outer diameter of the largest diameter cable for which the enclosure 300 is designed/sized. In use, the openings 352B and brace walls 352 limit lateral displacement (e.g., bending, twisting, translating, shifting) of the cables 12 in the openings. This can help to attenuate forces applied to the connection via the cables 12, 14 and prevent movement of the cables 12, 14 from distorting the cover housing 320 and/or the sealant 360, 370. Such distortion may degrade the environmental seal of the enclosed connection 24'.

The strain relief system 350 also imparts additional rigidity to the enclosure assembly 300. This improved strength can enhance the performance of the enclosure both during installation and in service.

The housing 320 may also include supplemental openings 355 in the covers 322, 324. The openings 355 may be used to receive zip ties to secure the enclosure 300 closed and/or to receive a rod or other device for suspending the enclosure 300.

Enclosure assemblies as disclosed herein and/or features thereof may be used with other types of electrical connectors in place of the connector 200.

It will be appreciated that enclosures in accordance with the present invention may have components (e.g., cover members, walls, etc.) and cavities or chambers having shapes, configurations and/or sizes different than those shown and described herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An enclosed connection system for mechanically and electrically connecting first and second cables each including an elongate electrical conductor covered by an insulation layer, the enclosed connection system comprising:
   a) an insulation piercing connector including:
      at least one electrically conductive piercing member; and
      a clamping mechanism configured and operable to force the at least one piercing member through the insulation layers of the first and second cables and into electrical engagement with the conductors of the first and second cables to form a connection including the insulation piercing connector and the first and second cables wherein the conductors of the first and second cables are electrically connected to one another through the at least one piercing member; and
   b) an enclosure configured to receive and cover the connection and to protect the insulation piercing connector;
   wherein:
      the enclosure includes first and second cover members defining first and second cover member cavities, respectively, and being pivotally connected by a hinge;
      the first and second cover members are relatively pivotable about the hinge between an open position to receive the connection and a closed position wherein the first and second cover members define an enclosure cavity to contain the connection such that the insulation piercing connector is encapsulated in the first and second cover members; and
      the enclosed connection system includes:
         a main latch mechanism including:
            a first latch feature forming a part of the first cover member; and
            a second latch feature forming a part of the second cover member; and
         a safety latch mechanism including:
            a safety latch member pivotally connected to the first cover member by a second hinge, the safety latch member including a first safety latch feature; and
            a second safety latch feature on the second cover member;
      wherein:
         the first and second latch features are configured to interlock with one another when the first and second members are placed in the closed position; and
         the safety latch member is configured to pivot about the second hinge from a ready position to a safety latching position after the first and second cover members are placed in the closed position; and
         in the safety latching position, the first and second safety latch features are interlocked with one another.

2. The enclosed connection system of claim 1 wherein the enclosure includes a flowable sealant disposed in at least one of the first and second cover members to provide a seal about the insulation piercing connector.

3. The enclosed connection system of claim 2 wherein the sealant is a gel.

4. The enclosed connection system of claim 2 wherein the enclosure includes a first flowable sealant disposed in the first cover member cavity and a second flowable sealant disposed in the second cover member cavity;
   wherein the enclosure is configured such that the insulation piercing connector will displace the first and second sealants when the first and second cover members are moved from the open position to the closed position about the insulation piercing connector.

5. The enclosed connection system of claim 4 wherein the first and second sealants are first and second gels adapted to be elongated and elastically deformed in the closed position when the insulation piercing connector is disposed in the enclosure cavity.

6. The enclosed connection system of claim 4 wherein:
   the insulation piercing connector has a connector volume;
   the first and second sealants include first and second voids, respectively, defined therein to receive the insulation piercing connector, the first and second voids having a first void volume and a second void volume, respectively; and the sum of the first void volume and the second void volume is less than the connector volume.

7. The enclosed connection system of claim 6 wherein the sum of the first void volume and the second void volume is between about 60 and 100 percent of the connector volume.

8. The enclosed connection system of claim 4 wherein:
the first cover member includes an integral sealant retention flange projecting above an upper surface of the first sealant;
the second cover member includes an integral sealant retention groove positioned below an upper surface of the second sealant and containing a portion of the second sealant; and
when the first and second cover members are moved from the open position to the closed position about the insulation piercing connector, the sealant retention flange will enter the sealant retention groove and embed in the second sealant in the sealant retention groove to form a seal at the interface between the first and second cavities.

9. The enclosed connection system of claim 4 wherein:
the first cover member includes:
a first port extension forming a part of the first cover member cavity;
a first strain relief slot; and
a first openable port wall located between the first port extension and the first strain relief slot;
the second cover member includes:
a second port extension forming a part of the second cover member cavity;
a second strain relief slot; and
a second openable port wall located between the first port extension and the first strain relief slot; and
when the first and second cover members are in the closed position:
the first and second port extensions combine to form a cable port;
the first and second strain relief slots combine to form a strain relief opening;
the first and second port walls partition the cable port from the strain relief opening;
the enclosure is configured to receive the first cable such that the first cable extends from the insulation piercing connector in the enclosure cavity, through the cable port, through the first and second port walls, and through the strain relief opening;
the first and second port walls inhibit flow of the first and second flowable sealants from the cable port toward the strain relief opening; and
the strain relief opening is configured to receive a portion of the first cable to provide strain relief for the first cable.

10. The enclosed connection assembly of claim 2 wherein at least one of the first and second cover members includes a plurality of integral ribs configured to enhance adhesion between the sealant and the cover member.

11. The enclosed connection system of claim 1 wherein the enclosure includes:
a conductor port configured to receive the first conductor therethrough; and
a frangible port wall extending across the conductor port.

12. The enclosed connection system of claim 1 wherein the enclosure cavity has a shape that substantially conforms to a shape of the insulation piercing connector.

13. The enclosed connection system of claim 1 wherein at least one of the first latch feature and the second latch feature includes a curved latch finger.

14. The enclosed connection system of claim 1 wherein the first safety latch feature includes a ramped cam surface that forces the first and second cover members together as the safety latch member is pivoted into the safety latching position.

15. A method for forming an enclosed connection assembly about first and second cables each including an elongate electrical conductor covered by an insulation layer, the method comprising:
a) providing an insulation piercing connector including:
at least one electrically conductive piercing member; and
a clamping mechanism configured and operable to force the at least one piercing member through the insulation layers of the first and second cables and into electrical engagement with the conductors of the first and second cables to form a connection including the insulation piercing connector and the first and second cables wherein the conductors of the first and second cables are electrically connected to one another through the at least one piercing member;
b) selectively operating the clamping mechanism of the insulation piercing connector to force the at least one piercing member through the insulation layers of the first and second cables and into electrical engagement with the conductors of the first and second cables such that the conductors of the first and second cables are electrically connected to one another through the at least one piercing member to thereby form a connection; and
c) covering the connection and protecting the insulation piercing connector with an enclosure;
wherein:
the enclosure includes first and second cover members defining first and second cover member cavities, respectively, and being pivotally connected by a hinge;
the first and second cover members are relatively pivotable about the hinge between an open position to receive the connection and a closed position wherein the first and second cover members define an enclosure cavity to contain the connection such that the insulation piercing connector is encapsulated in the first and second cover members;
the enclosed connection system includes:
a main latch mechanism including:
a first latch feature forming a part of the first cover member; and
a second latch feature forming a part of the second cover member; and
a safety latch mechanism including:
a safety latch member pivotally connected to the first cover member by a second hinge, the safety latch member including a first safety latch feature; and
a second safety latch feature on the second cover member;
wherein:
the first and second latch features are configured to interlock with one another when the first and second members are placed in the closed position;
the safety latch member is configured to pivot about the second hinge from a ready position to a safety latching position after the first and second cover members are placed in the closed position; and in the safety latching position, the first and second safety latch features are interlocked with one another; and covering the connection and protecting the insulation piercing connector with the enclosure includes:

placing the first and second members in the closed position about the insulation piercing connector; and thereafter, placing the safety latch member in the safety latching mechanism.

16. A solar electrical power generation collection system comprising:
a plurality of distributed solar electrical generation devices;
a plurality of feed cables each extending from a respective one of the solar electrical generation devices;
a trunk cable; and
a plurality of enclosed connection systems each mechanically and electrically connecting a respective one of the feed cables to the trunk cable, each enclosed connection system including:
 a) an insulation piercing connector including:
  at least one electrically conductive piercing member; and
  a clamping mechanism configured and operable to force the at least one piercing member through the insulation layers of the feed and trunk cables and into electrical engagement with the conductors of the feed and trunk cables such that the conductors of the feed and trunk cables are electrically connected to one another through the at least one piercing member; and
 b) an enclosure configured to receive and cover the connection and to protect the insulation piercing connector;
wherein:
 the enclosure includes first and second cover members defining first and second cover member cavities, respectively, and being pivotally connected by a hinge;
 the first and second cover members are relatively pivotable about the hinge between an open position to receive the connection and a closed position wherein the first and second cover members define an enclosure cavity to contain the connection such that the insulation piercing connector is encapsulated in the first and second cover members; and
the enclosed connection system includes:
 a main latch mechanism including:
  a first latch feature forming a part of the first cover member; and
  a second latch feature forming a part of the second cover member; and
 a safety latch mechanism including:
  a safety latch member pivotally connected to the first cover member by a second hinge, the safety latch member including a first safety latch feature; and
  a second safety latch feature on the second cover member;
 wherein:
  the first and second latch features are configured to interlock with one another when the first and second members are placed in the closed position; and
  the safety latch member is configured to pivot about the second hinge from a ready position to a safety latching position after the first and second cover members are placed in the closed position; and
  in the safety latching position, the first and second safety latch features are interlocked with one another.

17. The solar electrical power generation collection system of claim 16 wherein the enclosure includes a flowable sealant disposed in at least one of the first and second cover members to provide a seal about the insulation piercing connector.

18. The solar electrical power generation collection system of claim 16 wherein at least one of the first latch feature and the second latch feature includes a curved latch finger.

* * * * *